United States Patent
Wagner et al.

(10) Patent No.: US 10,072,133 B2
(45) Date of Patent: Sep. 11, 2018

(54) PLASTICIZER COMPOSITION CONTAINING FURAN DERIVATIVES AND 1,2-CYCLOHEXANEDICARBOXYLIC ESTER

(71) Applicant: BASF SE, Ludwigshafen (DE)

(72) Inventors: Jochen Wagner, Ruppertsweiler (DE); Boris Breitscheidel, Waldsee (DE); Martin A. Bohn, Mannheim (DE); Benoit Blank, Edingen-Neckarhausen (DE); Alois Kindler, Grünstadt (DE)

(73) Assignee: BASF SE (DE)

( * ) Notice: Subject to any disclaimer, the term of this patent is extended or adjusted under 35 U.S.C. 154(b) by 8 days.

(21) Appl. No.: 15/109,861

(22) PCT Filed: Jan. 8, 2015

(86) PCT No.: PCT/EP2015/050207
§ 371 (c)(1),
(2) Date: Jul. 6, 2016

(87) PCT Pub. No.: WO2015/104309
PCT Pub. Date: Jul. 16, 2015

(65) Prior Publication Data
US 2016/0326347 A1  Nov. 10, 2016

(30) Foreign Application Priority Data
Jan. 9, 2014  (EP) .................................. 14150617

(51) Int. Cl.
| | |
|---|---|
| *C08K 5/00* | (2006.01) |
| *C08K 5/1535* | (2006.01) |
| *C08J 3/18* | (2006.01) |
| *C08K 5/12* | (2006.01) |

(52) U.S. Cl.
CPC ............... *C08K 5/1535* (2013.01); *C08J 3/18* (2013.01); *C08K 5/0016* (2013.01); *C08K 5/12* (2013.01)

(58) Field of Classification Search
CPC ............. C08K 5/1535; C08K 5/12; C08J 3/18
USPC ........................................................ 524/285
See application file for complete search history.

(56) References Cited

U.S. PATENT DOCUMENTS

| | | | |
|---|---|---|---|
| 2,921,089 | A | 1/1960 | Hagemeyer, Jr. et al. |
| 3,418,351 | A | 12/1968 | Greene et al. |
| 3,932,523 | A | 1/1976 | Strohmeyer et al. |
| 4,148,830 | A | 4/1979 | Pruett et al. |
| 4,426,524 | A | 1/1984 | Plummer |
| 5,288,918 | A | 2/1994 | Maher et al. |
| 5,324,853 | A | 6/1994 | Jones et al. |
| 5,434,313 | A | 7/1995 | Harrison et al. |
| 5,696,297 | A | 12/1997 | Kneuper et al. |
| 5,849,972 | A | 12/1998 | Vicari et al. |
| 6,225,507 | B1 | 5/2001 | Giessler et al. |
| 6,310,235 | B1 | 10/2001 | Gick |
| 6,310,261 | B1 | 10/2001 | Geissler et al. |
| 6,437,170 | B1 | 8/2002 | Thil et al. |
| 6,723,884 | B1 | 4/2004 | Grenacher et al. |
| 6,765,119 | B2 | 7/2004 | Hoffmann et al. |
| 6,888,021 | B2* | 5/2005 | Brunner ............... C07C 51/36 524/285 |
| 7,173,138 | B2 | 2/2007 | Ahlers et al. |
| 7,208,545 | B1 | 4/2007 | Brunner et al. |
| 7,385,075 | B2 | 6/2008 | Disteldorf et al. |
| 7,973,194 | B1 | 7/2011 | Kinkade et al. |
| 8,943,693 | B2 | 2/2015 | Wolz |
| 9,084,983 | B2 | 7/2015 | Königsmann et al. |
| 9,133,321 | B2 | 9/2015 | Becker et al. |
| 9,169,228 | B2 | 10/2015 | Grass et al. |
| 9,346,965 | B2 | 5/2016 | Becker et al. |
| 2010/0305250 | A1* | 12/2010 | Colle ................... C08K 5/0016 524/112 |

FOREIGN PATENT DOCUMENTS

| | | |
|---|---|---|
| DE | 1593368 A1 | 7/1970 |
| DE | 1945359 A1 | 3/1971 |
| DE | 2139630 A1 | 2/1973 |
| DE | 2244373 A1 | 4/1974 |
| DE | 2404855 A1 | 8/1975 |
| DE | 2445303 A1 | 4/1976 |
| DE | 2612355 A1 | 10/1977 |
| DE | 2628987 A1 | 1/1978 |
| DE | 3228881 A1 | 2/1984 |
| DE | 4339713 A1 | 5/1995 |
| DE | 102011004676 A1 | 8/2012 |
| EP | 366089 A2 | 5/1990 |
| EP | 695734 A1 | 2/1996 |
| EP | 880494 A1 | 12/1998 |
| EP | 1047655 A1 | 11/2000 |
| FR | 2060622 | 6/1971 |
| GB | 1512797 A | 6/1978 |
| GB | 1579159 A | 11/1980 |
| WO | WO-95/14647 A1 | 6/1995 |
| WO | WO-9730016 A1 | 8/1997 |
| WO | WO-9823566 A1 | 6/1998 |
| WO | WO-99/32427 A1 | 7/1999 |
| WO | WO-9936382 A1 | 7/1999 |
| WO | WO-0063151 A1 | 10/2000 |
| WO | WO-00/78704 A1 | 12/2000 |
| WO | WO-01014297 A1 | 3/2001 |
| WO | WO-01087809 A1 | 11/2001 |
| WO | WO-02/38531 A1 | 5/2002 |
| WO | WO-0283695 A1 | 10/2002 |
| WO | WO-05028407 A1 | 3/2005 |
| WO | WO-2011/023490 A1 | 3/2011 |
| WO | WO-2011/023491 A1 | 3/2011 |
| WO | WO-2011082991 A2 | 7/2011 |
| WO | WO-2012/113608 A1 | 8/2012 |
| WO | WO-2012/113609 A1 | 8/2012 |

OTHER PUBLICATIONS

Sanderson et al., J. Appl. Polym. Sci., 53(13), 1785-1793, 1994.*
International Search Report for PCT/EP2015/050207 dated Mar. 30, 2015.
Sanderson, R., et al., "Synthesis and Evaluation of Dialkyl Furan-2,5-Dicarboxylates as Plasticizers for PVC", Journal of Applied Polymer Science, vol. 53, No. 13, 1994, pp. 1785-1793.

* cited by examiner

*Primary Examiner* — Hui Chin

(74) *Attorney, Agent, or Firm* — Drinker Biddle & Reath LLP

(57) ABSTRACT

The present invention relates to a plasticizer composition which comprises at least one furan derivative and at least one 1,2-cyclohexanedicarboxylate ester, molding compounds which comprise a thermoplastic polymer or an elastomer and such a plasticizer composition and the use of these plasticizer compositions and molding compounds.

18 Claims, 1 Drawing Sheet

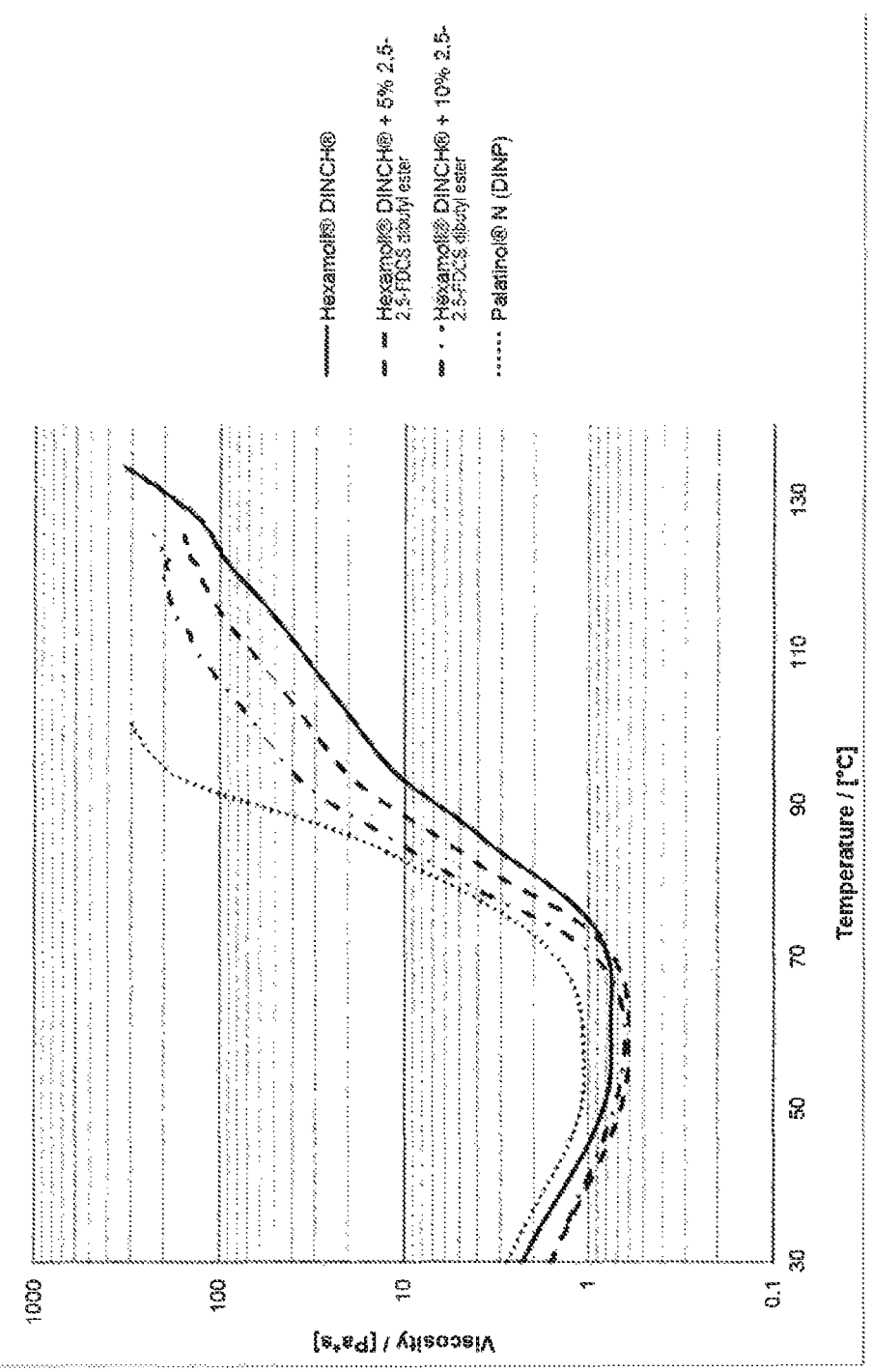

PLASTICIZER COMPOSITION CONTAINING FURAN DERIVATIVES AND 1,2-CYCLOHEXANEDICARBOXYLIC ESTER

CROSS-REFERENCE TO RELATED APPLICATIONS

This application is a national stage application (under 35 U.S.C. § 371) of PCT/EP2015/050207, filed Jan. 8, 2015, which claims benefit of European Application No. 14150617.0, filed Jan. 9, 2014, both of which are incorporated herein by reference in their entirety.

BACKGROUND OF THE INVENTION

The present invention relates to a plasticizer composition which comprises at least one furan derivative and at least one 1,2-cyclohexanedicarboxylate ester, molding compounds which comprise a thermoplastic polymer or an elastomer and such a plasticizer composition and the use of these plasticizer compositions and molding compounds.

PRIOR ART

To achieve desired processing or use properties, so-called plasticizers are added to many plastics in order to make these softer, more flexible and/or more ductile. In general, the use of plasticizers serves to shift the thermoplastic range of plastics to lower temperatures, in order to obtain the desired elastic properties in the range of lower processing and use temperatures.

Polyvinyl chloride (PVC) is among the most produced plastics in terms of quantity. Because of its multiplicity of possible uses, it is nowadays found in a large number of products in everyday life. A great commercial importance is therefore ascribed to PVC. Originally, PVC is a plastic which is rigid and brittle up to ca. 80° C., which via the addition of heat stabilizers and other additives is used as rigid PVC (PVC-U). Only by the addition of suitable plasticizers is soft PVC (PVC-P) obtained, which can be used for many use purposes for which the rigid PVC is unsuitable.

Further important thermoplastic polymers in which plasticizers are usually to be found are for example polyvinyl butyral (PVB), homo- and copolymers of styrene, polyacrylates, polysulfides or thermoplastic polyurethanes (PU).

Whether a substance is suitable for use as a plasticizer for a particular polymer largely depends on the properties of the polymer to be plasticized. As a rule, plasticizers are desired which have high compatibility with the polymer to be plasticized, i.e. impart good thermoplastic properties to this and only have a low tendency to evaporation and/or sweating (high permanence).

A large number of different compounds for plasticizing PVC and other plastics are obtainable on the market. Because of their good compatibility with PVC and their advantageous use properties, phthalate diesters with alcohols of different chemical structure, such as for example diethylhexyl phthalate (DEHP), diisononyl phthalate (DINP) and diisodecyl phthalate (DIDP) were often used in the past as plasticizers. Short-chain phthalates, such as for example dibutyl phthalate (DBP), diisobutyl phthalate (DIBP), benzyl butyl phthalate (BBP) or diisoheptyl phthalate (DIHP), are also used as fast fusers, e.g. in the production of so-called plastisols. Apart from the short-chain phthalates, dibenzoate esters such as dipropylene glycol dibenzoate can also be used for the same purpose. A further class of plasticizers with good gelling properties are for example the phenyl and cresyl esters of alkylsulfonic acids, which are obtainable under the trademark Mesamoll®.

Plastisols are initially a suspension of finely powdered plastics in liquid plasticizers. Here the rate of dissolution of the polymer in the plasticizer at ambient temperature is very low. Only on heating to higher temperatures does the polymer dissolve appreciably in the plasticizer. In the process, the individual isolated plastic aggregates swell and fuse into a highly viscous three-dimensional gel. This process is described as gelling and takes place beyond a certain minimum temperature, which is described as the gelling or dissolution temperature. The gelling step is not reversible.

Since plastisols exist in liquid form, these are very often used for coating a great variety of materials, such as for example textiles, glass non-wovens, etc. In such cases, the coating is very often built up of several layers.

In industry, therefore, the procedure often used in the processing of plastisol products is that one layer of plastisol is applied and directly afterwards the plastic, in particular PVC, is gelled with the plasticizer above the dissolution temperature, thus a solid layer consisting of a mixture of gelled, partly gelled and non-gelled plastic particles is formed. The next layer is then applied onto this gelled layer and after application of the last layer the whole structure is processed as a whole to the completely gelled plastic product by heating to higher temperatures.

Apart from plastisols, dry powder mixtures of plasticizer and plastics can also be produced. Such dry blends, in particular based on PVC, can then be further processed at elevated temperatures, e.g. by extrusion, to granules or processed to the completely gelled plastic product by conventional molding processes, such as injection molding, extrusion or calendering.

In addition, because of the increasing technical and economic demands on the processing of thermoplastic polymers and elastomers, plasticizers which have good gelling properties are also desired.

Particularly in the production and processing of PVC plastisols, for example for the production of PVC coatings, it is inter alia desirable to have a plasticizer with a low gelling temperature available as a fast fuser. In addition, high storage stability for the plastisol is desirable, in other words the non-gelled plastisol should exhibit only a slight or no viscosity increase with time at ambient temperature. These properties should as far as possible be attained by addition of a suitable plasticizer with rapid gelling properties, whereby the use of further viscosity-decreasing additives and/or of solvents should be unnecessary.

However, as a rule fast fusers often have compatibility with the polymers to which they are added which requires improvement, and likewise a permanence which also still requires improvement. Hence in order to arrive at the desired plasticizer properties the use is also known of mixtures of plasticizers, for example at least one plasticizer which imparts good thermoplastic properties, but gels less well, in combination with at least one fast fuser.

Furthermore, there is the need to replace at least some of the phthalate plasticizers mentioned at the outset, since these are suspected of being harmful to health. This applies especially for sensitive use fields such as children's toys, food packaging or medical articles.

In the prior art, various alternative plasticizers with different properties are known for various plastics and especially for PVC.

A class of plasticizers known from the prior art, which can be used as an alternative to phthalates, is based on cyclohexanepolycarboxylic acids, as described in WO 99/32427.

In contrast to their non-hydrogenated aromatic analogs, these compounds are toxicologically harmless and can also be used in sensitive use fields. The corresponding lower alkyl esters as a rule have fast fusing properties.

WO 00/78704 describes selected dialkyl cyclohexane-1,3- and 1,4-dicarboxylate esters for use as plasticizers in synthetic materials.

U.S. Pat. No. 7,973,194 B1 teaches the use of dibenzyl cyclohexane-1,4-dicarboxylate, benzyl butyl cyclohexane-1,4-dicarboxylate and dibutyl cyclohexane-1,4-dicarboxylate as fast fusing plasticizers for PVC.

A further class of plasticizers are the esters of 2,5-furandicarboxylic acid (FDCS).

WO 2012/113608 describes $C_5$ dialkyl esters of 2,5-furandicarboxylic acid and use thereof as plasticizers. These short-chain esters are also especially suitable for the production of plastisols.

WO 2012/113609 describes $C_7$ dialkyl esters of 2,5-furandicarboxylic acid and use thereof as plasticizers.

WO 2011/023490 describes $C_9$ dialkyl esters of 2,5-furandicarboxylic acid and use thereof as plasticizers.

WO 2011/023491 describes $C_{10}$ dialkyl esters of 2,5-furandicarboxylic acid and use thereof as plasticizers.

R. D. Sanderson et al. (J. Appl. Pol. Sci., 1994, Vol. 53, 1785-1793) describe the synthesis of esters of 2,5-furandicarboxylic acid and use thereof as plasticizers for plastics, in particular polyvinyl chloride (PVC), polyvinyl butyral (PVB), polylactic acid (PLA), polyhydroxybutyric acid (PHB) or polyalkyl methacrylate (PAMA). Specifically, the di(2-ethylhexyl)-, di(2-octyl)-, dihexyl- and dibutyl esters of 2,5-furandicarboxylic acid are described and their plasticizing properties characterized by dynamic mechanical thermal analyses.

The present invention is based on the objective of providing a plasticizer composition for thermoplastic polymers and elastomers which on the one hand imparts good thermoplastic properties and on the other hand good gelling properties, i.e. a low gelling temperature. The plasticizer composition should thereby in particular be suitable for the preparation of plastisols. The plasticizer composition should have high compatibility with the polymer to be plasticized, possess high permanence, and also be toxicologically harmless.

Surprisingly, this problem is solved by means of a plasticizer composition comprising a) at least one compound of the general formula (I),

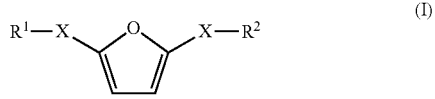

wherein

X is *—(C=O)—O—, *—(CH$_2$)$_n$—O— or *—(CH$_2$)$_n$—O—(C=O)—, wherein * represents the linkage point with the furan ring and n has the value 0, 1 or 2; and $R^1$ and $R^2$ are mutually independently selected from $C_4$ alkyl and $C_5$-$C_8$ cycloalkyl, wherein the cycloalkyl residues are unsubstituted or can be substituted with at least one $C_1$-$C_{10}$ alkyl residue substituted, b) at least one compound of the general formula (II),

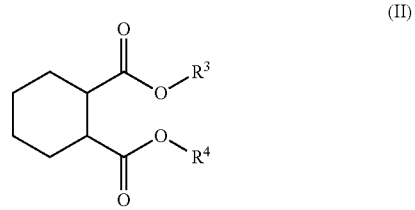

wherein $R^3$ and $R^4$ are mutually independently selected from branched and unbranched $C_7$-$C_{12}$ alkyl residues.

A further subject of the invention are molding compounds which comprise at least one thermoplastic polymer or elastomer and one plasticizer composition, as defined previously and below.

A further subject of the invention is the use of a plasticizer composition, as defined previously and below, as a plasticizer for thermoplastic polymers, in particular polyvinyl chloride (PVC), and elastomers.

A further subject of the invention is the use of a plasticizer composition, as defined previously and below, as a plasticizer in plastisols.

A further subject of the invention is the use of these molding compounds for the production of molded articles and films.

A BRIEF DESCRIPTION OF THE FIGURE

FIG. 1 shows the gelling behavior of PVC plastisols each with a total content of plasticizer composition according to the invention of 60 phr. Here plasticizer compositions according to the invention which comprise the commercially available plasticizer Hexamoll® DINCH® and different quantities of the fast fuser 2,5-FDCS dibutyl ester were used. Additionally, the comparison is shown of the gelling behavior of PVC plastisols which comprise exclusively the commercially available plasticizers Hexamoll® DINCH® or Palatinol® N (DINP). The viscosity of the plastisols as a function of temperature is shown.

DESCRIPTION OF THE INVENTION

The plasticizer compositions according to the invention have the following advantages:

The plasticizer compositions according to the invention are characterized by high compatibility with the polymer to be plasticized, in particular PVC.

The plasticizer compositions according to the invention impart to the polymer to be plasticized a high permanence.

The plasticizer compositions according to the invention are advantageously suitable for the obtention of a large number of very diverse and complex processing and use properties of plastics.

The plasticizer composition according to the invention is advantageously suitable for the production of plastisols.

The compounds (I) present in the plasticizer composition according to the invention are very suitable as fast fusers, on the basis of their exceptionally low dissolution temperatures according to DIN 53408. Small quantities of the compounds (I) in the plasticizer composition according to the invention are already sufficient to reduce the temperature necessary for gelling a thermoplastic polymer and/or to increase the rate thereof.

The plasticizer compositions according to the invention are suitable for use for the production of molded articles and films for sensitive use fields such as medicinal products, food packaging, products for the interior sector, for example homes and vehicles, toys, child care articles, etc.

For the production of the compounds (I) present in the plasticizer compositions according to the invention, readily accessible educts can be used. A particular economic and ecological advantage lies in the possibility of being able to use both petrochemical raw materials available in large quantities and also renewable raw materials for the production of the compounds (I) used according to the invention. Thus for example the starting materials for the furan nuclei are obtainable from naturally occurring carbohydrates such as cellulose and starch, whereas the alcohols usable for the introduction of the side-chains are available from large-scale industrial processes. Thus on the one hand the demand for "sustainable" products can be covered, on the other hand, however, profitable production is also possible.

The methods for the production of the compounds (I) used according to the invention are simple and efficient, hence these can be prepared without difficulty on the large industrial scale.

As mentioned above, it was surprisingly found that the compounds of the general formula (I) present in the plasticizer composition according to the invention, in particular the $C_4$ dialkyl esters of furandicarboxylic acid, have very low dissolution temperatures and excellent gelling properties. Thus their dissolution temperatures according to DIN 53408 lie markedly below the dissolution temperatures of the corresponding dialkyl esters of phthalic acid and have at least equally good rapid gelling properties.

It was found that the compounds (I), especially in combination with 1,2-cyclohexanedicarboxylate esters of the general formula (II), are suitable for improving the gelling behavior of thermoplastic polymers and elastomers. Also, small quantities of the compounds (I) in the plasticizer composition according to the invention are already sufficient to reduce the temperature necessary for gelling and/or to increase the gelling rate.

In the context of the present invention, a fast fuser is understood to mean a plasticizer which has a dissolution temperature according to DIN 53408 of less than 120° C. Such fast fusers are used in particular for the production of plastisols.

In the context of the present invention, the expression "$C_1$-$C_{10}$ alkyl" comprises straight-chain or branched $C_1$-$C_8$ alkyl groups. Preferably however these are straight-chain or branched $C_1$-$C_8$ alkyl groups. These include methyl, ethyl, propyl, isopropyl, n-butyl, isobutyl, sec.-butyl, tert.-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl and the like. Particularly preferably, however, they are straight-chain or branched $C_1$-$C_5$ alkyl groups.

The expression "$C_4$ alkyl" comprises straight-chain and branched $C_4$ alkyl groups. Preferably, $C_4$ alkyl is selected from n-butyl, isobutyl, sec.-butyl and tert.-butyl. Particularly preferably, $C_4$ alkyl is n-butyl or isobutyl.

The expression "$C_7$-$C_{12}$ alkyl" comprises straight-chain and branched $C_7$-$C_{12}$ alkyl groups. Preferably $C_7$-$C_{12}$ alkyl is selected from n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl and the like. Particularly preferably, $C_7$-$C_{12}$ alkyl is n-octyl, n-nonyl, isononyl, 2-ethylhexyl, isodecyl, 2-propylheptyl, n-undecyl or isoundecyl.

In the sense of the present invention, the expression "$C_5$-$C_5$ cycloalkyl" comprises cyclic hydrocarbons with 5 to 6, in particular with 6 carbon atoms. These include cyclopentyl or cyclohexyl.

Substituted $C_5$-$C_6$ cycloalkyl groups can, depending on their ring size, have one or more (e.g. 1, 2, 3, 4 or 5) $C_1$-$C_{10}$ alkyl substituents. Examples of substituted $C_7$-$C_{12}$ cycloalkyl groups are 2- and 3-methylcyclopentyl, 2- and 3-ethylcyclopentyl, 2-, 3- and 4-methylcyclohexyl, 2-, 3- and 4-ethylcyclohexyl, 2-, 3- and 4-propylcyclohexyl, 2-, 3- and 4-isopropylcyclohexyl, 2-, 3- and 4-butylcyclohexyl, 2-, 3- and 4-sec.-butyl cyclohexyl and 2-, 3- and 4-tert.-butylcyclohexyl.

Preferably the groups X in the compounds of the general formula (I) have the same meaning.

In a first preferred embodiment, in the compounds of the general formula (I), the groups X both are *—(C=O)$_n$—O—.

In a further preferred embodiment, in the compounds of the general formula (I) the groups X both are *—(CH$_2$)—O—(C=O)—.

In a further preferred embodiment, in the compounds of the general formula (I) the groups X both are *—(CH$_2$)$_n$—O—, wherein n is 0, 1 or 2. Particularly preferably, n is 1.

Preferably, in the compounds of the general formula (I) the residues $R^1$ and $R^2$ mutually independently are an unbranched or branched $C_4$ alkyl residue.

Particularly preferably, in the compounds of the general formula (I) the residues $R^1$ and $R^2$ mutually independently are n-butyl or isobutyl.

In a preferred implementation, in the compounds of the general formula (I) the residues $R^1$ and $R^2$ have the same meaning.

Preferred compounds of the general formula (I) are selected from
di-(n-butyl) 2,5-furandicarboxylate,
di-n-butyl ether of 2,5-di(hydroxymethyl)furan,
2,5-di(hydroxymethyl)furan di-n-butanoate,
di-(isobutyl) 2,5-furandicarboxylate,
di-isobutyl ether of 2,5-di(hydroxymethyl)furan,
2,5-di(hydroxymethyl)furan di-isobutanoate
and mixtures of two or more than two of the aforementioned compounds.

A particularly preferably compound of the general formula (I) is di-(n-butyl) 2,5-furandicarboxylate.

In a further preferred embodiment, in the compounds of the general formula (II) the residues $R^3$ and $R^4$ have the same meaning.

Preferably, in the compounds of the general formula (II) the residues $R^3$ and $R^4$ both are 2-ethylhexyl, both are isononyl or both are 2-propylheptyl.

A particularly preferably compound of the general formula (II) is di-(isononyl) 1,2-cyclohexanedicarboxylate.

By adaptation of the contents of the compounds (I) and (II) in the plasticizer composition according to the invention, the plasticizer properties can be matched to the relevant use purpose. For use in specific use fields, it can in some cases be helpful to ad to the plasticizer compositions according to the invention further plasticizers different from the compounds (I) and (II). For this reason, the plasticizer composition according to the invention can optionally comprise at least one further plasticizer different from the compounds (I) and (II).

The additional plasticizer different from the compounds (I) and (II) is selected from dialkyl phthalate esters, aryl alkyl phthalate esters, 1,2-cyclohexanedicarboxylate esters different from compounds (II), dialkyl terephthalate esters, trialkyl trimellitate esters, alkyl benzoate esters, dibenzoate esters of glycols, hydroxybenzoate esters, esters of saturated mono- and dicarboxylic acids, esters of unsaturated dicarboxylic acids, amides and esters of aromatic sulfonic acids, alkylsulfonate esters, glycerin esters, isosorbide esters, phosphate esters, citrate triesters, alkylpyrrolidone derivatives, 2,5-furandicarboxylate esters different from compounds (I), 2,5-tetrahydrofurandicarboxylate esters, epoxidized plant oils and epoxidized fatty acid monoalkyl esters, and polyesters of aliphatic and/or aromatic polycarboxylic acids with at least dihydric alcohols.

Suitable dialkyl phthalate esters which can advantageously be mixed with the compounds (I) and (II), mutually independently have 4 to 13 C atoms, preferably 8 to 13 C atoms, in the alkyl chains. A suitable alkyl aralkyl phthalate ester is for example benzyl butyl phthalate. Suitable 1,2-cyclohexanedicarboxylate esters different from the compounds (II) mutually independently have respectively 3 to 6 C atoms, preferably 4 to 6 C atoms, in the alkyl chains. Suitable dialkyl terephthalate esters preferably mutually independently have respectively 4 to 13 C atoms, in particular 7 to 11 C atoms, in the alkyl chains. Suitable dialkyl terephthalate esters are for example di-(n-butyl) terephthalate dialkyl ester, di-(2-ethylhexyl) terephthalate dialkyl esters, di-(isononyl) terephthalate dialkyl esters or di-(2-propylheptyl) terephthalate dialkyl esters. Suitable trialkyl trimellitate esters preferably mutually independently have respectively 4 to 13 C atoms, in particular 7 to 11 C atoms, in the alkyl chains. Suitable alkyl benzoate esters preferably mutually independently have respectively 7 to 13 C atoms, in particular 9 to 13 C atoms, in the alkyl chains. Preferred alkyl benzoate esters are for example isononyl benzoate, isodecyl benzoate or 2-propylheptyl benzoate. Suitable dibenzoate esters of glycols are diethylene glycol dibenzoate and dibutylene glycol dibenzoate. Suitable esters of saturated mono- and dicarboxylic acids are for example esters of acetic acid, butyric acid, valeric acid, succinic acid or lactic acid and the mono- and dialkyl esters of glutaric acid, adipic acid, sebacic acid, malic acid or tartaric acid. Suitable dialkyl adipate esters preferably mutually independently have respectively 4 to 13 C atoms, in particular 6 to 10 C atoms, in the alkyl chains. Suitable esters of unsaturated dicarboxylic acids are for example esters of maleic acid and fumaric acid. Suitable alkylsulfonate esters preferably have an alkyl residue with 8 to 22 C atoms. These include for example the phenyl or cresyl esters of pentadecyl-sulfonic acid. Suitable isosorbide esters are isosorbide diesters, which are preferably mutually independently respectively esterified with $C_8$-$C_{13}$ carboxylic acids. Suitable phosphate esters are tri-2-ethylhexyl phosphate, trioctyl phosphate, triphenyl phosphate, isodecyl diphenyl phosphate, bis-(2-ethylhexyl) phenyl phosphate and 2-ethylhexyl diphenyl phosphate. In the citrate triesters, the OH group can be present in free or carboxylated form, preferably acetylated.

The alkyl residues of the acetylated citrate triesters preferably mutually independently have 4 to 8 C atoms, in particular 6 to 8 C atoms. Suitable are alkylpyrrolidone derivatives with alkyl residues of 4 to 18 C atoms. Suitable dialkyl 2,5-furandicarboxylate esters different from the compounds (I) mutually independently have respectively 7 to 13 C atoms, preferably 8 to 12 C atoms, in the alkyl chains. Suitable dialkyl 2,5-tetrahydrofurandicarbylate esters mutually independently have respectively 7 to 13 C atoms, preferably 8 to 12 C atoms, in the alkyl chains. Suitable epoxidized plant oils are for example epoxidized fatty acids from epoxidized soya oil, for example. obtainable from Galata-Chemicals, Lampertheim, Germany. Epoxidized fatty acid monoalkyl esters, for example obtainable under the trademark reFlex™ of PolyOne, USA, are also suitable. The polyesters of aliphatic and aromatic polycarboxylic acids are preferably polyesters of adipic acid with polyhydric alcohols, in particular dialkylene glycol polyadipates with 2 to 6 carbon atoms in the alkylene residue.

In all the above-mentioned cases, the alkyl residues can each be linear or branched and in each case be the same or different. Reference is made to the general statements made at the outset concerning suitable and preferred alkyl residues.

The content of the at least one further plasticizer different from the compounds (I) and (II) in the plasticizer composition according to the invention is usually 0 to 50 wt. %, preferably 0 to 40 wt. %, particularly preferably 0 to 30 wt. % and in particular 0 to 25 wt. %, based on the total quantity of the at least one further plasticizer and the compounds (I) and (II) in the plasticizer composition.

In a preferred embodiment, the plasticizer composition according to the invention comprises no further plasticizer different from the compounds (I) and (II).

Preferably, the content of compounds of the general formula (I) in the plasticizer composition according to the invention is 1 to 50 wt. %, particularly preferably 2 to 40 wt. % and in particular 3 to 30 wt. %, based on the total quantity of the compounds (I) and (II) in the plasticizer composition.

Preferably, the content of the compounds of the general formula (II) in the plasticizer composition according to the invention is 10 to 99 wt. %, particularly preferably 50 to 98 wt. % and in particular 70 to 97 wt. %, based on the total quantity of the compounds (I) and (II) in the plasticizer composition.

In the plasticizer composition according to the invention, the weight ratio between compounds of the general formula (I) and compounds of the general formula (II) preferably lies in the range from 1:100 to 1:1, particularly preferably in the range from 1:50 to 1:2 and in particular in the range from 1:30 to 1:2.

Molding Compounds

A further subject of the present invention relates to a molding compound, comprising at least one polymer and a plasticizer composition as previously defined.

In a preferred embodiment, the polymer present in the molding compound is a thermoplastic polymer.

As thermoplastic polymers, all thermoplastically processable polymers are possible. In particular, these thermoplastic polymers are selected from:
homo- or copolymers which comprise at least one monomer incorporated by polymerization, which is selected from $C_2$-$C_{10}$ monoolefins, such as for example ethylene or propylene, 1,3-butadiene, 2-chloro-1,3-butadiene, vinyl alcohol and $C_2$-$C_{10}$ alkyl esters thereof, vinyl chloride, vinylidene chloride, vinylidene fluoride, tetrafluoroethylene, glycidyl acrylate, glycidyl methacrylate, acrylates and methacrylates with alcohol components of branched and unbranched $C_1$-$C_{10}$ alcohols, vinyl aromatics such as for example styrene, (meth) acrylonitrile, α,β-ethylenically unsaturated mono- and dicarboxylic acids, and maleic anhydride;

homo- and copolymers of vinyl acetals;

polyvinyl esters;

polycarbonates (PC);

polyesters, such as polyalkylene terephthalates, polyhydroxyalkanoates (PHA), polybutylene succinates (PBS) and polybutylene succinate adipates (PBSA);

polyethers;

polyether ketones;

thermoplastic polyurethanes (TPU);

polysulfides;

polysulfones;

and mixtures thereof.

Polyacrylates with the same or different alcohol residues from the group of the $C_4$-$C_8$ alcohols, particularly butanol, hexanol, octanol and 2-ethylhexanol, polymethyl methacrylate (PMMA), methyl methacrylate-butyl acrylate copolymers, acrylonitrile-butadiene-styrene copolymers (ABS), ethylene-propylene copolymers, ethylene-propylene-diene copolymers (EPDM), polystyrene (PS), styrene-acrylonitrile copolymers (SAN), acrylonitrile-styrene-acrylate (ASA), styrene-butadiene-methyl methacrylate copolymers (SBMMA), styrene-maleic anhydride copolymers, styrene-methacrylic acid copolymers (SMA), polyoxymethylene (POM), polyvinylalcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethylcellulose (EC), cellulose acetate (CA), cellulose propionate (CP) or cellulose acetate/butyrate (CAB) can for example be mentioned.

Preferably, the at least one thermoplastic polymer present in the molding compound according to the invention is polyvinyl chloride (PVC), polyvinyl butyral (PVB) or homo- and copolymers of vinyl acetate, homo- and copolymers of styrene, polyacrylates, thermoplastic polyurethanes (TPU) or polysulfides.

Depending on which thermoplastic polymer or thermoplastic polymer mixture is present in the molding compound, different quantities of plasticizer are used. As a rule, the total plasticizer content in the molding compound is 0.5 to 300 phr (parts per hundred resin=parts by weight per hundred parts by weight polymer), preferably 0.5 to 130 phr, particularly preferably 1 to 35 phr.

In particular, the at least one thermoplastic polymer present in the molding compound according to the invention is polyvinyl chloride (PVC).

Polyvinyl chloride is obtained by homopolymerization of vinyl chloride. The polyvinyl chloride (PVC) used according to the invention can for example be produced by suspension polymerization, microsuspension polymerization, emulsion polymerization or bulk polymerization. The production of PVC by polymerization of vinyl chloride and production and composition of plasticized PVC are for example described in "Becker/Braun, Kunststoff-Handbuch, Volume 2/1: Polyvinyl Chloride", $2^{nd}$ Edition, Carl Hanser Verlag, München.

For the PVC plasticized according to the invention, the K value, which characterizes the molecular mass of the PVC and is determined according to DIN 53726, mostly lies between 57 and 90, preferably between 61 and 85, in particular between 64 and 75.

In the context of the invention, the content of PVC in the molding compounds according to the invention is about 20 to 95 wt. %, preferably about 45 to 90 wt. % and in particular about 50 to 85 wt. %.

If the thermoplastic polymer in the molding compounds according to the invention is polyvinyl chloride, the total plasticizer content in the molding compound is 1 to 300 phr, preferably 5 to 130 phr, particularly preferably 10 to 120 phr and in particular 15 to 100 phr.

A further subject of the present invention relates to molding compounds comprising at least one elastomer and at least one plasticizer composition as previously defined.

Preferably, the elastomer present in the molding compounds according to the invention is at least one natural rubber (NR), or at least one synthetically produced rubber, or mixtures thereof. Preferred synthetically produced rubbers are for example polyisoprene rubber (IR), styrene-butadiene rubber (SBR), butadiene rubber (BR), nitrile-butadiene rubber (NBR) or chloroprene rubber (CR).

Rubbers or rubber mixtures which can be vulcanized with sulfur are preferable.

In the context of the invention, the content of elastomer in the molding compounds according to the invention is about 20 to 95 wt. %, preferably about 45 to 90 wt. % and in particular about 50 to 85 wt. %.

In the context of the invention, the molding compounds which comprise at least one elastomer, in addition to the above components, can comprise other suitable additives. For example, they can comprise reinforcing fillers such as carbon black or silicon dioxide, other fillers, a methylene donor such as hexamethylenetetramine (HMT), a methylene acceptor, such as phenol resins modified with cardanol (from cashew nuts), a vulcanizing or crosslinking agent, a vulcanization or crosslinking accelerator, activators, various types of oil, anti-ageing agents and various other additives which are for example mixed into tire and other rubber compounds.

If the polymer in the molding compounds according to the invention is rubbers, the content of the plasticizer composition according to the invention, as defined above, in the molding compound is 1 to 60 phr, preferably 1 to 40 phr, particularly preferably 2 to 30 phr.

Additives Molding Compound

In the context of the invention, the molding compounds comprising at least one thermoplastic polymer can comprise other suitable additives. For example, they can comprise stabilizers, lubricants, fillers, pigments, flame retardants, light stabilizers, propellants, polymeric processing aids, impact modifiers, optical brighteners, antistatic agents or biostabilizers.

Below, some suitable additives are described in more detail. However, the examples presented do not represent any limitation of the molding compounds according to the invention, but serve only for illustration. All content information is stated in wt. % based on the total molding compound.

As stabilizers, all usual PVC stabilizers in solid and liquid form are possible, for example usual Ca/Zn, Ba/Zn, Pb or Sn stabilizers and also acid-binding layer silicates such as hydrotalcite.

The molding compounds according to the invention can have a content of stabilizers from 0.05 to 7%, preferably 0.1 to 5%, particularly preferably from 0.2 to 4% and in particular from 0.5 to 3%.

Lubricants should become active between the PVC pastilles and counteract frictional forces during mixing, plasticizing and molding.

As lubricants, the molding compounds according to the invention can comprise all lubricants usual for the processing of plastics. For example, hydrocarbons, such as oils, paraffins and PE waxes, fatty alcohols with 6 to 20 carbon atoms, ketones, carboxylic acids, such as fatty acids and montanic acid, oxidized PE wax, metal salts of carboxylic acids, carboxylic acid amides and carboxylate esters, for example with the alcohols ethanol, fatty alcohols, glycerin, ethanediol and pentaerythritol and long-chain carboxylic acids as the acid component are possible.

The molding compounds according to the invention can have a content of lubricant from 0.01 to 10%, preferably 0.05 to 5%, particularly preferably from 0.1 to 3% and in particular from 0.2 to 2%.

Fillers chiefly influence the compressive, tensile and bending strength and the rigidity and thermal deformation resistance of plasticized PVC favorably.

In the context of the invention, the molding compounds can also comprise fillers, such as for example carbon black and other organic fillers, such as natural calcium carbonates, for example chalk, limestone and marble, synthetic calcium carbonates, dolomite, silicates, silicic acid, sand, diatomaceous earth, and aluminum silicates, such as kaolin, mica and feldspar. Preferably, calcium carbonates, chalk, dolomite, kaolin, silicates, talc or carbon black are used as fillers.

The molding compounds according to the invention can have a content of fillers from 0.01 to 80%, preferably 0.1 to 60%, particularly preferably from 0.5 to 50% and in particular from 1 to 40%.

The molding compounds according to the invention can also comprise pigments in order to adapt the product obtained to different possible uses.

In the context of the present invention, both inorganic pigments and also organic pigments can be used. As inorganic pigments, for example cobalt pigments such as CoO/$Al_2O_3$, and chromium pigments, for example $Cr_2O_3$, can be used. As organic pigments, for example monoazo pigments, condensed azo pigments, azomethine pigments, anthraquinone pigments, quinacridones, phthalocyanine pigments, dioxazine pigments and aniline pigments are possible.

The molding compounds according to the invention can have a content of pigments from 0.01 to 10%, preferably 0.05 to 5%, particularly preferably from 0.1 to 3% and in particular from 0.5 to 2%.

In order to reduce flammability and to decrease smoke evolution during combustion, molding compounds according to the invention can also comprise flame retardants.

As flame retardants, for example antimony trioxide, phosphate esters, chloroparaffin, aluminum hydroxide, boron compounds, molybdenum trioxide, ferrocene, calcium carbonate or magnesium carbonate can be used.

The molding compounds according to the invention can have a content of flame retardants from 0.01 to 10%, preferably 0.1 to 8%, particularly preferably from 0.2 to 5% and in particular from 0.5 to 2%.

In order to protect articles produced from the molding compounds according to the invention against damage in the surface region due to influence of light, the molding compounds can also comprise light stabilizers, e.g. UV absorbers.

In the context of the present invention, for example hydroxybenzophenones, hydroxyphenylbenzotriazoles, cyanoacrylates or so-called "hindered aminine light stabilizers" (HALS), such as the derivatives of 2,2,6,6-tetramethylpiperidine, can be used as light stabilizers.

The molding compounds according to the invention can have a content of light stabilizers, e.g. UV absorbers, from 0.01 to 7%, preferably 0.1 to 5%, particularly preferably from 0.2 to 4% and in particular from 0.5 to 3%.

Production of the Compounds of the General Formula (I)

The production of the compounds of the general formula (I) present in the plasticizer compositions according to the invention is described below.

Production of the Diesters of 2,5-furandicarboxylic acid Compounds of the General Formula (I.1),

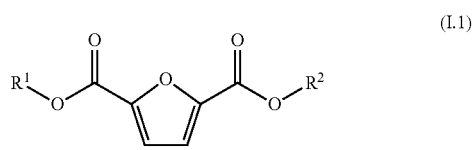

wherein $R^1$ and $R^2$ have the aforesaid meanings, are obtainable by a method in which a) optionally 2,5-furandicarboxylic acid or an anhydride or acid halide thereof is reacted with a $C_1$-$C_3$ alkanol in presence of a catalyst with obtention of a di-($C_1$-$C_3$ alkyl) 2,5-furandicarboxylate, b) 2,5-furandicarboxylic acid or an anhydride or acid halide thereof or the di-($C_1$-$C_3$ alkyl) 2,5-furandicarboxylate obtained in step a) is reacted with at least one alcohol $R^1$—OH and, if $R^1$ and $R^2$ different meanings, additionally with at least one alcohol $R^2$—OH in presence of at least one catalyst with obtention of a compound of the formula (I.1).

Concerning suitable and preferred embodiments of the residues $R^1$ and $R^2$ reference is made to the previous statements in their entirety.

Suitable $C_1$-$C_3$ alkanols for use in step a) are for example methanol, ethanol, n-propanol or mixtures thereof.

In step b) of the process, the 2,5-furandicarboxylic acid or the di-($C_1$-$C_3$ alkyl) 2,5-furandicarboxylate obtained in step a) is subjected to an esterification or transesterification with at least one alcohol $R^1$—OH and, if $R^1$ and $R^2$ have different meanings, additionally with at least one alcohol $R^2$—OH to give the compounds of the formula (I.1).

Esterification

The conversion of the 2,5-furandicarboxylic acid (FDCS) into the corresponding di-($C_1$-$C_3$ alkyl) 2,5-furandicarboxylates and/or ester compounds of the general formulae (I.1) can be effected by usual methods known to those skilled in the art. These include the reaction of at least one alcohol component, selected from $C_1$-$C_3$ alkanols or the alcohols $R^1$—OH and $R^2$—OH respectively, with FDCS or a suitable derivative thereof. Suitable derivatives are for example the acid halides and acid anhydrides. A preferred acid halide is the acid chloride. As esterification catalysts, the catalysts usual for this can be used, e.g. mineral acids such as sulfuric acid and phosphoric acid; organic sulfonic acids, such methanesulfonic acid and p-toluenesulfonic acid; amphoteric catalysts, in particular titanium, tin (IV) or zirconium compounds, such as tetraalkoxytitaniums, e.g. tetrabutoxytitanium, and tin (IV) oxide. The water forming during the reaction can be removed by usual measures, e.g. by distillation. WO 02/38531 describes a process for the production of esters of polybasic carboxylic acids, in which a) in a reaction zone, a mixture essentially consisting of the acid component or an anhydride thereof and the alcohol component is heated to boiling in presence of an esterification catalyst, b) the alcohol and water-comprising vapors are separated by rectification into an alcohol-rich fraction and a water-rich fraction, and c) the alcohol-rich fraction is returned to the reaction zone and the water-rich fraction is discharged from the process. The process described in WO 02/38531 and the catalysts disclosed therein are also suitable for the esterification.

The esterification catalyst is used in an effective quantity, which usually lies in the range from 0.05 to 10 wt. %, preferably 0.1 to 5 wt. %, based on the sum of acid component (or anhydride) and alcohol component.

Further suitable processes for the production of the compounds of the general formula (I.1) by esterification are for example in U.S. Pat. No. 6,310,235, U.S. Pat. No. 5,324,853, DE-A 2612355 or DE-A 1945359. Reference is made to said documents in their entirety.

As a rule, the esterification of FDCS is preferably effected in presence of the above-described alcohol components, by means of an organic acid or mineral acid, in particular concentrated sulfuric acid. For this, the alcohol component is advantageously used in at least double the stoichiometric quantity, based on the quantity of FDCS or a suitable derivative thereof in the reaction mixture.

The esterification can as a rule be effected at ambient pressure or decreased or increased pressure. Preferably, the esterification is performed at ambient pressure or decreased pressure.

The esterification can be performed in the absence of an added solvent or in presence of an organic solvent.

If the esterification is performed in presence of a solvent, this is preferably an organic solvent inert under the reaction conditions. These include for example aliphatic hydrocarbons, halogenated aliphatic hydrocarbons, aromatic and substituted aromatic hydrocarbons or ethers. Preferably the solvent is selected from pentane, hexane, heptane, ligroin, petroleum ether, cyclohexane, dichloromethane, trichloromethane, tetrachloromethane, benzene, toluene, xylene, chlorobenzene, dichlorobenzenes, dibutyl ether, THF, dioxan and mixtures thereof.

The esterification is usually performed in a temperature range from 50 to 250° C.

If the esterification catalyst is selected from organic acids or mineral acids, the esterification is usually performed in a temperature range from 50 to 160° C.

If the esterification catalyst is selected from amphoteric catalysts, the esterification is usually performed in a temperature range from 100 to 250° C.

The esterification can be effected in the absence or in presence of an inert gas. An inert gas is as a rule understood to be a gas which under the given reaction conditions enters into no reactions with the educts, reagents and solvents involved in the reaction or the products arising. Preferably the esterification takes place without the introduction of an inert gas.

Transesterification:

The transesterification of the di-($C_1$-$C_3$ alkyl) 2,5-furandicarboxylates to the corresponding ester compounds I.1 according to the process step b) can be effected by usual processes known to those skilled in the art. These include the reaction of the di-($C_1$-$C_3$) alkyl ester with at least one $C_4$ alkanol or $C_5$ to $C_6$ cycloalkanol or mixtures thereof in presence of a suitable transesterification catalyst.

As transesterification catalysts, the usual catalysts commonly used for transesterification reactions, which are mostly also used in esterification reactions, are possible. These for example include mineral acids, such as sulfuric acid and phosphoric acid; organic sulfonic acids, such as methanesulfonic acid and p-toluenesulfonic acid; or specific metal catalysts from the group of the tin (IV) catalysts, for example dialkyltin dicarboxylates such as dibutyltin diacetate, trialkyltin alkoxides, monoalkyltin compounds such as monobutyltin dioxide, tin salts such as tin acetate or tin oxides; from the group of the titanium catalysts, monomeric and polymeric titanates and titanium chelates such as tetraethyl orthotitanate, tetrapropyl orthotitanate, tetrabutyl orthotitanate and triethanolamine titanate; from the group of the zirconium catalysts, zirconates and zirconium chelates such as tetrapropyl zirconate, tetrabutyl zirconate, and triethanolamine zirconate; and lithium catalysts such as lithium salts, lithium alkoxides; or aluminum(III), chromium(III), iron(III), cobalt(II), nickel(II) and zinc(II) acetylacetonate.

The quantity of transesterification catalyst used is about 0.05 to 5 wt. %, preferably about 0.1 to 1 wt. %. The reaction mixture is preferably heated to the boiling point of the reaction mixture, so that the reaction temperature lies between 20° C. and 200° C. depending on the reactants.

The transesterification can be effected at ambient pressure or decreased or increased pressure. Preferably the transesterification is performed at a pressure from 0.001 to 200 bar, particularly preferably 0.01 to 5 bar. The lower-boiling alcohol eliminated during the transesterification is preferably distilled off continuously in order to shift the equilibrium of the transesterification reaction. The distillation column required for this is as a rule directly connected to transesterification reactor, preferably it is installed directly on this. In case of the use of several transesterification reactors connected in series, each of these reactors can be equipped with a distillation column, or preferably the vaporized alcohol mixture can be passed to one distillation column from the last vessels of the transesterification reactor cascade via one or more collector pipes. The higher boiling alcohol recovered in this distillation is preferably returned again to the transesterification.

In case of the use of an amphoteric catalyst, its separation is generally effected by hydrolysis and subsequent separation of the metal oxide formed, e.g. by filtration. Preferably, after the reaction has taken place, the catalyst is hydrolyzed by washing with water and the precipitated metal oxide filtered off. If desired, the filtrate can be subjected to a further workup for isolation and/or purification of the product. The product is preferably separated by distillation.

The transesterification of the di-($C_1$-$C_3$ alkyl) 2,5-furandicarboxylates is preferably effected in presence of the alcohol component and in presence of at least one titanium (IV) alcoholate. Preferred titanium (IV) alcoholates are tetrapropoxytitanium, tetrabutoxytitanium or mixtures thereof. Preferably, the alcohol component is used in at least double the stoichiometric quantity, based on the di-($C_1$-$C_3$ alkyl) ester used.

The transesterification can be performed in the absence or in presence of an added organic solvent. Preferably, the transesterification is performed in presence of an inert organic solvent. Suitable organic solvents are those mentioned above for the esterification. These include in particular toluene and THF.

The temperature during the transesterification preferably lies in a range from 50 to 200° C.

The transesterification can be effected in the absence or in presence of an inert gas. An inert gas is as a rule understood to be a gas which under the given reaction conditions enters into no reactions with the educts, reagents and solvents involved in the reaction or the products arising. Preferably, the transesterification is performed without introduction of an inert gas.

A particularly suitable embodiment of the process comprises:
a) reaction of 2,5-furandicarboxylic acid with methanol in presence of concentrated sulfuric acid with obtention of dimethyl 2,5-furandicarboxylate,
b) reaction of the dimethyl 2,5-furandicarboxylate obtained in step a) with at least one alcohol $R^1$—OH in presence of at least one titanium (IV) alcoholate to give the compounds of the general formula (I.1).

Production of the $C_4$ Diether and $C_4$ Diester Derivatives of the Formula (I.2) and (I.3) Respectively Compounds of the General Formula (I.2) or (I.3),

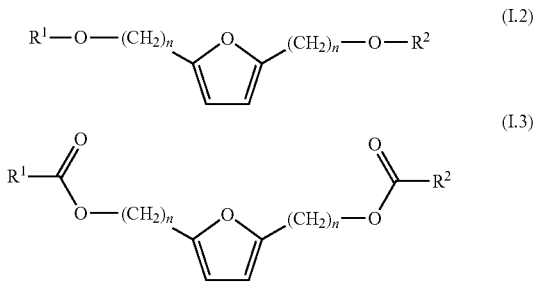

wherein $R^1$ and $R^2$ have one of the aforesaid meanings and n has the value 1 or 2, are obtainable by a process in which either
a) 2,5-di-(hydroxymethyl)furan (n=1) or 2,5-di-(hydroxyethyl)furan (n=2) is reacted with at least one alkylating agent $R^1$—Z and, if $R^1$ and $R^2$ have different meanings, additionally with at least one alkylating agent $R^2$—Z, wherein Z is a leaving group, in presence of a base to give compounds of the formula (I.2),
or
b) 2,5-di-(hydroxymethyl)furan (n=1) or 2,5-di-(hydroxyethyl)furan (n=2) is reacted with at least one acid halide $R^1$—(C=O)X and, if $R^1$ and $R^2$ have different meanings, additionally with at least one acid halide $R^2$—(C=O)X, wherein X is Br or Cl, in presence of at least one tertiary amine, to give compounds of the formula (I.3).

As a rule, the alkylation is performed in presence of an organic solvent inert under the reaction conditions. Suitable solvents are those previously mentioned for the esterification. Preferred solvents are aromatic hydrocarbons, such as toluene.

The leaving group Z preferably is a residue which is selected from Br, Cl, or the tosyl, mesyl or triflyl group.

Particularly preferably, the leaving group Z is Br.

The alkylating agents $R^1$—Z and $R^2$—Z are commercially available or can be produced from the corresponding alcohols by suitable reactions or procedures familiar to those skilled in the art. For example, the alkyl bromides $R^1$—Br and $R^2$—Br preferably used for this process can be produced in known manner on the large industrial scale from the corresponding alcohols $R^1$—OH or $R^2$—OH using hydrogen bromide (HBr).

As suitable bases, inorganic and/or strong organic bases are possible. These for example include inorganic bases or base formers, such as hydroxides, hydrides, amides, oxides and carbonates of the alkali and alkaline earth metals. These include LiON, NaOH, KOH, Mg(OH)$_2$, Ca(OH)$_2$, LiH, NaH, sodium amide (NaNH$_2$), lithium diisopropylamide (LDA), Na$_2$O, K$_2$CO$_3$, Na$_2$CO$_3$ and Cs$_2$CO$_3$; and organo-metallic compounds such as n-BuLi or tert.-BuLi. NaOH, KOH, K$_2$CO$_3$ and Na$_2$CO$_3$ are preferable.

Here the base is preferably used in at least two-fold stoichiometric excess, based on the 2,5-di-(hydroxymethyl)furan or. 2,5-di-(hydroxyethyl)furan. Particularly preferably, an at least fourfold stoichiometric excess of base is used.

The alkylation can be performed in the absence or in presence of an organic solvent. As a rule, the reaction is performed in presence of an inert organic solvent, such as pentane, hexane, heptane, ligroin, petroleum ether, cyclohexane, dichloromethane, trichloromethane, tetrachloromethane, benzene, toluene, xylene, chlorobenzene, dichlorobenzenes, dibutyl ether, THF, dioxan and mixtures thereof.

The alkylation can as a rule be effected at ambient pressure, decreased pressure or increased pressure. Preferably, the alkylation is performed at ambient pressure.

Preferably, the alkylation is performed in a temperature range from 30 to 200° C., preferably 50 to 150° C.

The alkylation can be effected in the absence or in presence of an inert gas. Preferably, no inert gas is used in the alkylation.

In a specific suitable embodiment of the alkylation, 2,5-di-(hydroxymethyl)furan or 2,5-di-(hydroxyethyl)furan are converted into the diether compounds of the general formula (I.2) in presence of an at least fourfold excess of base in an inert organic solvent and with at least one alkyl bromide $R^1$—Br or $R^2$—Br respectively. Concerning the residues $R^1$ and $R^2$, reference is made to the previous statements. An alkali metal hydroxide, in particular KOH, is preferably used as the base.

For the production of the ester compounds of the general formula (I.3), 2,5-di-(hydroxymethyl)furan or 2,5-di-(hydroxyethyl)furan is preferably converted to the compounds of the formula (I.3) with at least one acid halide $R^1$—(C=O)X and, if $R^1$ and $R^2$ have different meanings, with at least one acid halide $R^2$—(C=O)X, wherein X is Br or Cl, in presence of at least one tertiary amine.

Apart from these processes, still further common esterification methods are available to those skilled in the art, as previously described in case of the esterification of FDCS.

For the production of the ester compounds of the general formula (I.3), all types of tertiary amines familiar to those skilled in the art can be used. Examples of suitable tertiary amines are:
from the group of the trialkylamines: trimethylamine, triethylamine, tri-n-propylamine, diethylisopropylamine, diisopropylethylamine and the like;
from the group of the N-cycloalkyl-N,N-dialkylamines: dimethylcyclohexylamine and diethylcyclohexylamine;
from the group of the N,N-dialkylanilines: dimethylaniline and diethylaniline;
from the group of the pyridine and quinoline bases: pyridine, α-, β- and γ-picoline, quinoline and 4-(dimethylamino)pyridine (DMAP).

Preferred tertiary amines are trialkylamines and pyridine bases, in particular triethylamine and 4-(dimethylamino)pyridine (DMAP) and mixtures thereof.

The esterification can be effected at ambient pressure, or at decreased or increased pressure. Preferably, the esterification is performed at ambient pressure.

The esterification can be performed in the absence or in presence of an organic solvent. Preferably, the esterification is performed in presence of an inert organic solvent, as previously defined.

The esterification is usually performed in a temperature range from 50 to 200° C.

The esterification can be effected in the absence or in presence of an inert gas.

In a preferred embodiment of the process for the production of the compounds I.3, 2,5-di-(hydroxymethyl)furan is converted to compounds of the formula (I.3) with an acid chloride $R^1$—(C=O)Cl in presence of triethylamine and/or DMAP and an inert organic solvent.

For the production of the compounds of the general formula (I), $C_4$ alkanols and $C_5$-$C_6$ cycloalkanols are used as educts.

Preferred $C_4$ alkanols can be straight-chain or branched or consist of mixtures of straight-chain and branched butanols. These include 1-butanol, 2-butanol, 2-methyl-1-propanol or 2-methyl-2-propanol and mixtures thereof. Preferable are 1-butanol or 2-methyl-1-propanol.

The $C_5$-$C_6$ cycloalkanols are selected from cyclopentanol or cyclohexanol and mixtures thereof. Cyclohexanol is preferable.

Depending on their ring size, substituted $C_5$-$C_6$ cycloalkanols can have one or more (e.g. 1, 2, 3, 4 or 5) $C_1$-$C_{10}$ alkyl substituents. Examples of $C_5$ to $C_6$ cycloalkanols are 1- and 3-methylcyclopentanol, 2- and 3-ethylcyclopentanol, 2-, 3- and 4-methyl-cyclohexanol, 2-, 3- and 4-ethylcyclohexanol, 2-, 3- and 4-propylcyclohexanol, 2-, 3- and 4-isopropylcyclohexanol, 2-, 3- and 4-butylcyclohexanol, 2-, 3- and 4-sec.-butylcyclohexanol and 2-, 3- and 4-tert.-butylcyclohexanol.

The furan-2,5-dicarboxylic acid (FDCS, CAS No. 3238-40-2) used for the production of the compounds of the general formula (I) can either be obtained commercially or produced by synthesis routes known in the literature. Thus, possibilities for the synthesis are found in the publication by Lewkowski et al. published on the Internet with the title "Synthesis, Chemistry and Application of 5-hydroxymethylfurfural and its derivatives" (Lewkowski et al., ARKIVOC 2001 (i), pages 17-54, ISSN 1424-6376). Common to most of these syntheses is an acid-catalyzed reaction of carbohydrates, in particular glucose or fructose, preferably fructose to give 5-hydroxymethylfurfural (5-HMF), which can be separated from the reaction mixture by process technology operations, such as for example the two-phase procedure. Similar results were described for example by Leshkov et al. in Science 2006, Vol. 312, pages 1933-1937 and by Zhang et al. in Angewandte Chemie 2008, Vol. 120, pages 9485-9488. In a further step, the 5-HMF can then be oxidized to FDCS, as for example cited by Christensen in ChemSusChem 2007, Vol. 1, pages 75-78.

2,5-bis(hydroxymethyl)furan (CAS No. 1883-75-6) can also either be obtained commercially or synthesized. The synthesis described take place starting from 5-HMF, which can be reduced in two steps via 2,5-bis(hydroxymethyl) furan (2,5-BHF) (Lewkowski et al., ARKIVOC 2001 (i), pages 17-54, ISSN 1424-6376).

2,5-bis(hydroxyethyl)furan can be obtained by reduction of the methyl 2,5-furandiacetate. Methyl 2,5-furandiacetate can be synthesized from 2,5-bis(hydroxy-methyl)furan (2,5-BHF) via suitable reactions familiar to those skilled in the art, such as for example analogously to the process described by Rau et al. in Liebigs Ann. Chem., Vol. 1984 (8. 1984), pages 1504-1512, ISSN 0947-3440. In this, 2,5-bis(chloromethyl)-furan is prepared from 2,5-BHF by reaction with thionyl chloride, which is converted to 2,5-bis(cyanomethyl) furan by the action of KCN in benzene in presence of [18]crown-6. The 2,5-bis(cyanomethyl)furan can then be saponified to the 2,5-furandiacetic acid and esterified with methanol to the dimethyl ester converted directly into the methyl 2,5-furandiacetate by alcoholysis with methanol (Pinner reaction). The methyl 2,5-furandiacetate can then be reduced to 2,5-bis(hydroxyethyl)furan.

The preparation of the methyl 2,5-furandiacetate can also be effected analogously to the process described by Kern et al. in Liebigs Ann. Chem., Vol. 1985 (6. 1985), pages 1168-1174, ISSN 0947-3440.

Compounds of the General Formula (II)

The compounds of the general formula (II) can either be obtained commercially or produced by processes known in the state of the art.

As a rule, the 1,2-cyclohexanedicarboxylate esters are mostly obtained by nuclear hydrogenation of the corresponding phthalate esters. The nuclear hydrogenation can be effected by the process described in WO 99/32427. A particularly suitable nuclear hydrogenation process is for example also described in WO 2011082991 A2.

Furthermore, 1,2-cyclohexanedicarboxylate esters can be obtained by esterification of 1,2-cyclohexanedicarboxylic acid or suitable derivatives thereof with the corresponding alcohols. The esterification can be effected by usual processes known to those skilled in the art.

It is common to the processes for the production of the compounds of the general formula (II) that, starting from phthalic acid, 1,2-cyclohexanedicarboxylic acid or suitable derivatives thereof, an esterification or a transesterification is performed, wherein the corresponding $C_7$-$C_{12}$ alkanols are used as educts. These alcohols are as a rule not pure substances, but rather an isomer mixture, the composition and purity whereof depends on the particular processes by which these are produced.

Preferred $C_7$-$C_{12}$ alkanols which are used for the production of the compounds (II) present in the plasticizer composition according to the invention can be straight-chain or branched or consist of mixtures of straight-chain and branched $C_7$-$C_{12}$ alkanols. These include n-heptanol, isoheptanol, n-octanol, isooctanol, 2-ethylhexanol, n-nonanol, isononanol, isodecanol, 2-propylheptanol, n-undecanol, isoundecanol, n-dodecanol or isododecanol. Particularly preferable $C_7$-$C_{12}$ alkanols are 2-ethylhexanol, isononanol and 2-propylheptanol, in particular isononanol.

Heptanol

The heptanols used for the production of the compounds of the general formula (II) can be straight-chain or branched or consist of mixtures of straight-chain and branched heptanols. Preferably mixtures of branched heptanols, also described as isoheptanol, which are obtainable by the rhodium- or preferably cobalt-catalyzed hydroformylation of dimeric propene, e.g. by the Dimersol® process, and subsequent hydrogenation of the isoheptanals obtained to give an isoheptanol mixture, are used. Depending on its production, the isoheptanol mixture thus obtained consists of several isomers. Essentially straight-chain heptanols can be obtained by rhodium- or preferably cobalt-catalyzed hydroformylation from 1-hexene and subsequent hydrogenation of the n-heptanal obtained to n-heptanol. The hydroformylation of 1-hexene or propene dimer can be effected by methods known per se: in the hydroformylation with rhodium catalysts homogeneously dissolved in the reaction medium, both uncomplexed rhodium carbonyls, which are formed in situ in the hydroformylation reaction mixture under the conditions of the hydroformylation reaction under the action of synthesis gas for example from rhodium salts, and also complex rhodium carbonyl compounds, in particular complexes with organic phosphines, such as triphenylphosphine, or organophosphites, preferably chelatising biphophites, as for example described in U.S. Pat. No. 5,288,918, be used as catalyst. In the cobalt-catalyzed hydroformylation of these olefins, in general cobalt carbonyl compounds homogeneously soluble in the reaction mixture, which are formed in situ from cobalt salts under the action of synthesis gas under the conditions of the hydroformylation reaction, are used. If the cobalt-catalyzed hydroformylation is carried out in presence of trialkyl- or triarylphosphines, the desired heptanols are formed directly as the hydroformylation product, so that further hydrogenation of the aldehyde function is no longer needed.

For the cobalt-catalyzed hydroformylation of 1-hexene or the hexene isomer mixtures, the industrially established processes explained in Falbe, New Syntheses with Carbon Monoxide, Springer, Berlin, 1980 on pages 162-168, such as the Ruhrchemie process, the BASF process, the Kuhlmann process or the Shell process are for example suitable. While the Ruhrchemie, BASF and the Kuhlmann processes operate with non-ligand-modified cobalt carbonyl compounds as catalysts, and thereby obtain hexanal mixtures, the Shell process (DE-A 1593368) uses phosphine or phosphite ligand-modified cobalt carbonyl compounds as catalyst, which because of their additional high hydrogenation activity lead directly to the hexanol mixtures. Advantageous embodiments for performing the hydroformylation with non-ligand-modified cobalt carbonyl complexes are described in detail in DE-A 2139630, DE-A 2244373, DE-A 2404855 and WO 01014297.

For the rhodium-catalyzed hydroformylation of 1-hexene or the hexene isomer mixtures, the industrially established rhodium low pressure hydroformylation process with triphenylphosphine ligand-modified rhodium carbonyl compounds, such as is the subject of U.S. Pat. No. 4,148,830, can be used. Advantageously, non-ligand-modified rhodium carbonyl compounds can be used as the catalyst for the rhodium-catalyzed hydroformylation of long-chain olefins such as the hexene isomer mixtures obtained according to the afore-mentioned processes, wherein in contrast to the low pressure process, a higher pressure of 80 to 400 bar has to be set. The implementation of such rhodium high-pressure hydroformylation processes is described in e.g. EP-A 695734, EP-B 880494 and EP-B 1047655.

The isoheptanal mixtures obtained after hydroformylation of the hexene isomer mixtures are catalytically hydrogenated to isoheptanol mixtures in a manner in itself usual. Preferably heterogeneous catalysts are used for this, which comprise as catalytically active components metals and/or metal oxides of groups VI to VIII, and of subgroup I of the periodic table of the elements, in particular chromium, molybdenum, manganese, rhenium, iron, cobalt, nickel and/or copper, optionally deposited on a support material such as $Al_2O_3$, $SiO_2$ and/or $TiO_2$. Such catalysts are for example described in DE-A 3228881, DE-A 2628987 and DE-A 2445303. Particularly advantageously, the hydrogenation of the isoheptanals is performed with an excess of hydrogen from 1.5 to 20% above the quantity of hydrogen stoichiometrically needed for the hydrogenation of the isoheptanals, at temperatures from 50 to 200° C. and at a hydrogen pressure from 25 to 350 bar, and for avoidance of side reactions, in accordance with to DE-A 2628987 a small quantity of water, advantageously in the form of an aqueous solution of an alkali metal hydroxide or carbonate corresponding to the teaching of WO 01087809 is added to the hydrogenation feed.

Octanol 2-ethylhexanol, which was for many years the plasticizer alcohol produced in the greatest quantities, can be obtained via the aldol condensation of n-butyraldehyde to 2-ethylhexenal and subsequent hydrogenation thereof to 2-ethylhexanol (see Ullmann's Encyclopedia of Industrial Chemistry; $5^{th}$ Edition, Vol. A 10, pp. 137-140, VCH Verlagsgesellschaft GmbH, Weinheim 1987).

Essentially straight-chain octanols can be obtained by the rhodium- or preferably cobalt-catalyzed hydroformylation of 1-heptene and subsequent hydrogenation of the n-octanal obtained to n-octanol. The 1-heptene needed for this can be obtained from the Fischer-Tropsch synthesis of hydrocarbons.

In contrast to 2-ethylhexanol or n-octanol, owing to the manner of its production the alcohol isooctanol is not a homogeneous chemical compound, but rather an isomer mixture of differently branched $C_8$ alcohols, for example of 2,3-dimethyl-1-hexanol, 3,5-dimethyl-1-hexanol, 4,5-dimethyl-1-hexanol, 3-methyl-1-heptanol and 5-methyl-1-heptanol, which can be present in the isooctanol in different proportions depending on the production conditions used. Isooctanol is usually produced by the codimerization of propene with butenes, preferably n-butenes, and subsequent hydroformylation of the mixture of heptane isomers thereby obtained. The octanal isomer mixture obtained in the hydroformylation can subsequently be hydrogenated to the isooctanol in a manner in itself usual.

The codimerization of propene with butenes to isomeric heptenes can advantageously be effected by the homogeneously catalyzed Dimersol® process (Chauvin et al; Chem. Ind.; May 1974, pp. 375-378), in which a soluble nickel-phosphine complex is used as the catalyst in presence of an ethylaluminum chlorine compound, for example ethylaluminum dichloride. As phosphine ligands for the nickel complex catalyst, tributylphosphine, triisopropylphosphine, tricyclohexylphosphine and/or tribenzyl-phosphine can for example be used. The reaction takes place at temperatures from 0 to 80° C., during which advantageously an pressure is set at which the olefins are present dissolved in the liquid reaction mixture (Cornils; Hermann: Applied Homogeneous Catalysis with Organometallic Compounds; $2^{nd}$ Edition; Vol. 1; pp. 254-259, Wiley-VCH, Weinheim 2002).

Alternatively to the Dimersol® process with nickel catalysts homogeneously dissolved in the reaction medium, the codimerization of propene with butenes can also be performed with heterogeneous NiO catalysts deposited on a support, whereby similar heptane isomer distributions are obtained as in the homogeneously catalyzed process. Such catalysts are for example used in the so-called Octal® process (Hydrocarbon Processing, February 1986, pp. 31-33), and a very suitable specific heterogeneous nickel catalyst for olefin dimerization or codimerization is for example disclosed in WO 9514647.

Instead of catalysts based on nickel, Brønsted acid heterogeneous catalysts can also be used for the codimerization of propene with butenes, whereby as a rule more highly branched heptenes than in the nickel-catalyzed process are obtained. Examples of catalysts suitable for this are solid phosphoric acid catalysts e.g. kieselguhr or diatomaceous earth impregnated with phosphoric acid, such as are used by the PolyGas® process for olefin di- or oligomerization (Chitnis et al; hydrocarbon Engineering 10, No. 6-June 2005). Very suitable Brønsted-acid catalysts for the codimerization of propene and butenes to heptenes are zeolites, which are utilized by the EMOGAS® process developed on the basis of the PolyGas® process.

The 1-heptene and the heptene isomer mixtures are converted into n-octanal or octanal isomer mixtures by the known methods explained above in connection with the production of n-heptanal and heptanal isomer mixtures by odium or cobalt-catalyzed hydroformylation, preferably cobalt-catalyzed hydroformylation. These are then hydrogenated to the corresponding octanols, e.g. by means of one of the catalysts mentioned above in connection with the production of n-heptanol and isoheptanol.

Nonanol

Essentially straight-chain nonanol can be obtained by rhodium or preferably cobalt-catalyzed hydroformylation from 1-octene and subsequent hydrogenation of the n-nonanal thereby obtained. The starting olefin 1-octene can for example be obtained via an ethylene oligomerization by means of a nickel complex catalyst homogeneously soluble in the reaction medium, 1,4-butanediol, with diphenylphosphinoacetic acid or 2-diphenylphosphinobenzoic acid as ligands. This process is also known under the name Shell Higher Olefins Process or SHOP process (see Weisermel, Arpe: Industrielle Organic Chemie; $5^{th}$ Edition; p. 96; Wiley-VCH, Weinheim 1998).

The isononanol which is used for the synthesis of the diisononyl esters of the general formula (II) present in the plasticizer composition according to the invention is not a homogeneous chemical compound, but rather a mixture of differently branched isomeric $C_9$ alcohols, which, depending on the manner of their production, in particular also the starting materials, can have different degrees of branching. In general, the isononanols are produced by dimerization of butenes to isooctene mixtures, subsequent hydroformylation of the isooctene mixtures and hydrogenation of the isononanal mixtures thus obtained to isononanol mixtures, as explained in Ullmann's Encyclopedia of Industrial Chemistry, $5^{th}$ Edition, Vol. A1, pp. 291-292, VCH Verlagsgesellschaft GmbH, Weinheim 1995.

As the starting material for the production of the isononanols, both isobutene, cis- and trans-2-butene and also 1-butene or mixtures of these butene isomers can be used. In the dimerization of pure isobutene mainly catalyzed by means of liquid, e.g. sulfuric or phosphoric acid, or solid, e.g. phosphoric acid applied onto kieselguhr, $SiO_2$ or $Al_2O_3$ as support material or zeolites or Brønsted acids, the strongly branched 2,4,4-trimethyl-pentene, also referred to as diisobutylene, is predominantly obtained, which after hydroformylation and hydrogenation of the aldehyde yields highly branched isononanols.

Isononanols with a lower degree of branching are preferable. Such low branching isononanol mixtures are produced from the linear butenes 1-butene, cis- and/or trans-2-butene, which optionally can comprise still smaller quantities of isobutene, via the above-described route of butene dimerization, hydroformylation of the isooctene and hydrogenation of the isononanal mixtures obtained. A preferred raw material is the so-called raffinate II, which is obtained from the $C_4$ cut from a cracker, for example a steam cracker, which is obtained after elimination of allenes, acetylenes and dienes, in particular 1,3-butadiene, through their partial hydrogenation to linear butenes or their separation by extractive distillation, for example by means of N-methylpyrrolidone, and subsequent Brønsted acid-catalyzed removal of the isobutene present therein by reaction thereof with methanol or isobutanol by established large-scale processes with formation of the fuel additive methyl-tert.-butyl ether (MTBE) or of the isobutyl tert.-butyl ether used for the obtention of pure isobutene.

As well as 1-butene and cis- and trans-2-butene, raffinate II still comprises n- and iso-butane and residual quantities of up to 5 wt. % of isobutene.

The dimerization of the linear butenes or of the butene mixture present in the raffinate II can be effected by means of the common processes operated on the large industrial scale, such as were explained above in connection with the generation of isoheptene mixtures, for example by means of heterogeneous, Brønsted acid catalysts, as used in the Poly-Gas® or EMOGAS® process, by means of the Dimersol® process using nickel complex catalysts homogeneously dissolved in the reaction medium or by means of heterogeneous, nickel(II) oxide-containing catalysts by the Octol® process or the process according to WO 9514647. The isooctene mixtures thus obtained are converted into isononal mixtures by the known process explained above in connection with the production of heptanal isomer mixtures by rhodium- or cobalt-catalyzed hydroformylation, preferably cobalt-catalyzed hydroformylation. These are then hydrogenated to the suitable isononal mixtures e.g. by means of catalysts mentioned above in connection with the production of isoheptanol.

The isononanol isomer mixtures thus produced can be characterized via their isoindex, which can be calculated from the degree of branching of the individual isomeric isononanol components in the isononanol mixture multiplied by the percentage content thereof in the isononanol mixture. Thus for example n-nonanol with the value 0, methyloctanols (one branching) with the value 1 and dimethylheptanols (two branchings) with the value 2 contribute to the isoindex of an isononanol. The higher the linearity, the lower is the isoindex of the isononanol mixture concerned. Accordingly, the isoindex of an isononanol mixture can be determined by gas chromatographic separation of the isononanol mixture into its individual isomers and associated therewith quantification of their percentage content in the isononanol mixture, determined by standard methods of gas chromatographic analysis. In order to increase the volatility and improve the gas chromatographic separation of the isomeric nonanols, these are advantageously trimethylsilylated by standard methods, for example by reaction with N-methyl-N-trimethylsilyltrifluoroacetamide, before the gas chromatographic analysis. In order to achieve as good a separation as possible of the individual components in the gas chromatographic analysis, capillary columns with polydimethylsiloxane as the stationary phase are preferably used. Such capillary columns are commercially available, and it requires only a few routine experiments by those skilled in the art in order to select an optimal product for this separation task from the large number available on the market.

The diisononyl esters of the general formula (II) used in the plasticizer composition according to the invention are in general esterified with isononanols with an isoindex from 0.8 to 2, preferably from 1.0 to 1.8 and particularly preferably from 1.1 to 1.5, which can be produced by the above-mentioned processes.

Purely by way of example, possible compositions of isononanol mixtures, such as can be used for the production of the compounds of the general formula (II) used according to the invention are stated below wherein it should be noted that the contents of the isomers stated in detail in the isononanol mixture can vary depending on the composition of the starting material, for example raffinate II, whose composition of butenes can vary depending on the production process, and on fluctuations in the production conditions used, for example the age of the catalyst used and temperature and pressure conditions to be adapted thereto.

For example, an isononanol mixture which was produced by cobalt-catalyzed hydroformylation and subsequent hydrogenation from an isooctene mixture generated using raffinate II as raw material by means of the catalyst and process according to WO 9514647 can have the following composition:

- 1.73 to 3.73 wt. %, preferably 1.93 to 3.53 wt. %, particularly preferably 2.23 to 3.23 wt. % 3-ethyl-6-methyl-hexanol;
- 0.38 to 1.38 wt. %, preferably 0.48 to 1.28 wt. %, particularly preferably 0.58 to 1.18 wt. % 2,6-dimethylheptanol;
- 2.78 to 4.78 wt. %, preferably 2.98 to 4.58 wt. %, particularly preferably 3.28 to 4.28 wt. % 3,5-dimethylheptanol;
- 6.30 to 16.30 wt. %, preferably 7.30 to 15.30 wt. %, particularly preferably 8.30 to 14.30 wt. % 3,6-dimethylheptanol;
- 5.74 to 11.74 wt. %, preferably 6.24 to 11.24 wt. %, particularly preferably 6.74 to 10.74 wt. % 4,6-dimethylheptanol;
- 1.64 to 3.64 wt. %, preferably 1.84 to 3.44 wt. %, particularly preferably 2.14 to 3.14 wt. % 3,4,5-trimethylhexanol;
- 1.47 to 5.47 wt. %, preferably 1.97 to 4.97 wt. %, particularly preferably 2.47 to 4.47 wt. % 3,4,5-trimethylhexanol, 3-methyl-4-ethylhexanol and 3-ethyl-4-methyl-hexanol;
- 4.00 to 10.00 wt. %, preferably 4.50 to 9.50 wt. %, particularly preferably 5.00 to 9.00 wt % 3,4-dimethylheptanol;
- 0.99 to 2.99 wt. %, preferably 1.19 to 2.79 wt. %, particularly preferably 1.49 to 2.49 wt. % 4-ethyl-5-methylhexanol and 3-ethylheptanol;
- 2.45 to 8.45 wt. %, preferably 2.95 to 7.95 wt. %, particularly preferably 3.45 to 7.45 wt. % 4,5-dimethylheptanol and 3-methyloctanol;
- 1.21 to 5.21 wt. %, preferably 1.71 to 4.71 wt. %, particularly preferably 2.21 to 4.21 wt. % 4,5-dimethylheptanol;
- 1.55 to 5.55 wt. %, preferably 2.05 to 5.05 wt. %, particularly preferably 2.55 to 4.55 wt. % 5,6-dimethylheptanol;
- 1.63 to 3.63 wt. %, preferably 1.83 to 3.43 wt. %, particularly preferably 2.13 to 3.13 wt. % 4-methyloctanol;
- 0.98 to 2.98 wt. %, preferably 1.18 to 2.78 wt. %, particularly preferably 1.48 to 2.48 wt. % 5-methyloctanol;
- 0.70 to 2.70 wt. %, preferably 0.90 to 2.50 wt. %, particularly preferably 1.20 to 2.20 wt. % 3,6,6-trimethylhexanol;
- 1.96 to 3.96 wt. %, preferably 2.16 to 3.76 wt. %, particularly preferably 2.46 to 3.46 wt. % 7-methyloctanol;
- 1.24 to 3.24 wt. %, preferably 1.44 to 3.04 wt. %, particularly preferably 1.74 to 2.74 wt. % 6-methyloctanol;
- 0.1 to 3 wt. %, preferably 0.2 to 2 wt. %, particularly preferably 0.3 to 1 wt. % n-nonanol;
- 25 to 35 wt. %, preferably 28 to 33 wt. %, particularly preferably 29 to 32 wt. % other alcohols with 9 and 10 carbon atoms; with the proviso that the overall sum of said components comes to 100 wt. %.

Correspondingly to the above statements, an isononanol mixture which was produced by cobalt-catalyzed hydroformylation and subsequent hydrogenation using an ethylene-containing butene mixture as raw material by means of the PolyGas® or EMOGAS® process can vary in the range of the following compositions, depending on the raw material composition and fluctuations in the reaction conditions used:

- 6.0 to 16.0 wt. %, preferably 7.0 to 15.0 wt. %, particularly preferably 8.0 to 14.0 wt. % n-nonanol;
- 12.8 to 28.8 wt. %, preferably 14.8 to 26.8 wt. %, particularly preferably 15.8 to 25.8 wt. % 6-methyloctanol;
- 12.5 to 28.8 wt. %, preferably 14.5 to 26.5 wt. %, particularly preferably 15.5 to 25.5 wt. % 4-methyloctanol;
- 3.3 to 7.3 wt. %, preferably 3.8 to 6.8 wt. %, particularly preferably 4.3 to 6.3 wt. % 2-methyloctanol;
- 5.7 to 11.7 wt. %, preferably 6.3 to 11.3 wt. %, particularly preferably 6.7 to 10.7 wt. % 3-ethylheptanol;
- 1.9 to 3.9 wt. %, preferably 2.1 to 3.7 wt. %, particularly preferably 2.4 to 3.4 wt % 2-ethylheptanol;
- 1.7 to 3.7 wt. %, preferably 1.9 to 3.5 wt. %, particularly preferably 2.2 to 3.2 wt. % 2-propylhexanol;
- 3.2 to 9.2 wt. %, preferably 3.7 to 8.7 wt. %, particularly preferably 4.2 to 8.2 wt. % 3,5-dimethylheptanol;
- 6.0 to 16.0 wt. %, preferably 7.0 to 15.0 wt. %, particularly preferably 8.0 to 14.0 wt. % 2,5-dimethylheptanol;
- 1.8 to 3.8 wt. %, preferably 2.0 to 3.6 wt. %, particularly preferably 2.3 to 3.3 wt. % 2,3-dimethylheptanol;
- 0.6 to 2.6 wt. %, preferably 0.8 to 2.4 wt. %, particularly preferably 1.1 to 2.1 wt. % 3-ethyl-4-methylhexanol;
- 2.0 to 4.0 wt. %, preferably 2.2 to 3.8 wt. %, particularly preferably 2.5 to 3.5 wt. % 2-ethyl-4-methylhexanol;
- 0.5 to 6.5 wt. %, preferably 1.5 to 6 wt. %, particularly preferably 1.5 to 5.5 wt. % other alcohols with 9 carbon atoms;
- with the proviso that the overall sum of said components comes to 100 wt. %.

Decanol

The isodecanol which is used for the synthesis of the diisodecyl esters of the general formula (II) present in the plasticizer composition according to the invention is not a homogeneous chemical compound, but rather a complex mixture of differently branched isomeric decanols.

These are in general produced by the nickel or Brønsted acid-catalyzed trimerization of propylene, for example by the PolyGas® or the EMOGAS® process explained above, subsequent hydroformylation of the isononene isomer mixture thus obtained by means of homogeneous rhodium or cobalt carbonyl catalysts, preferably by means of cobalt carbonyl catalysts and hydrogenation of the resulting isodecanal isomer mixture, e.g. by means of the catalysts and processes mentioned above in connection with the production of $C_7$-$C_9$ alcohols (Ullmann's Encyclopedia of Industrial Chemistry; 5$^{th}$ Edition, Vol. A1, p. 293, VCH Verlagsgesellschaft GmbH, Weinheim 1985). The isodecanol thus produced is in general strongly branched.

The 2-propylheptanol which is used for the synthesis of the di(2-propylheptyl) esters of the general formula (II) present in the plasticizer composition according to the invention can be pure 2-propylheptanol or propylheptanol isomer mixtures, such as are in general formed in the industrial production of 2-propylheptanol and commonly also described as 2-propylheptanol.

Pure 2-propylheptanol can be obtained by aldol condensation of n-valeraldehyde and subsequent hydrogenation of the 2-propylheptenal thus formed, for example according to U.S. Pat. No. 2,921,089. In general, depending on the production process, commercially available 2-propylheptanol, as well as the main component 2-propylheptanol, comprises one or more of the 2-propylheptanol isomers 2-propyl-4-methylhexanol, 2-propyl-5-methylhexanol, 2-isopropyl-heptanol, 2-isopropyl-4-methylhexanol, 2-isopropyl-5-methylhexanol and/or 2-propyl-4,4-dimethylpentanol. The presence of other isomers of 2-propylheptanols, for example 2-ethyl-2,4-dimethylhexanol, 2-ethyl-2-methylheptanol and/or 2-ethyl-2,5-dimethylhexanol in the 2-propylheptanol, is possible, because of the low rates of formation of the aldehydic precursors of these isomers in the course of the aldol condensation, these are present in the 2-propylheptanol only in trace amounts, if at all, and are of no practical importance for the plasticizer properties of the compound produced from such 2-propyheptanol isomer mixtures.

As the starting material for the production of 2-propylheptanol, a variety of carbon sources can be used, for example 1-butene, 2-butene, raffinate I—an alkane/alkene mixture obtained from the $C_4$ cut from a cracker after removal of allenes, acetylenes and dienes, which as well as 1- and 2-butene still comprises considerable quantities of isobutene or raffinate II, which is obtained from raffinate I by removal of isobutene and as olefin components apart from 1- and 2-butene only still comprises small amounts of isobutene. Of course, mixtures of raffinate I and raffinate II can also be used as raw material for the production of 2-propylheptanol. These olefins or olefin mixtures can be hydroformylated with cobalt- or rhodium catalysts by methods in itself usual, whereby from 1-butene a mixture of n- and iso-valeraldehyde—the name iso-valeraldehyde designates the compound 2-methylbutanal—is formed, the n/iso ratio whereof can very within relatively wide limits depending on the catalyst used and the catalyst and hydroformylation conditions. For example with use of a rhodium catalyst modified with triphenylphosphine (Rh/TPP), n- and iso-valeraldehyde are formed from 1-butene in an n/iso ratio of in general 10:1 to 20:1, whereas with use of phosphite ligands, for example according to U.S. Pat. No. 5,288,918 or WO 05028407, or of rhodium hydroformylation catalysts modified with phosphoamidite ligands, for example according to WO 0283695, almost exclusively n-valeraldehyde is formed. While the Rh/TPP catalyst system only very slowly converts 2-butene in the hydroformylation, so that most of the 2-butene can be recovered again from the hydroformylation mixture, the hydroformylation of the 2-butene succeeds with the said phosphite ligand- or phosphoramidite ligand-modified rhodium catalysts, and as a result n-valeraldehyde is predominantly formed. On the other hand, isobutene present in the olefinic raw material, albeit with differing rates, is hydroformylated to 3-methylbutanal by practically all catalyst systems and depending on the catalyst to a lesser extent to pivalaldehyde.

Depending on the starting materials and catalysts used, the $C_5$ aldehydes, i.e. n-valeraldehyde, optionally mixed with iso-valeraldehyde, 3-methylbutanal and/or pivalaldehyde, can if desired be completely or partially separated into the individual components before the aldol condensation, so that here also a possibility exists of influencing and controlling the isomer composition of the $C_{10}$ alcohol component of the ester mixture used according to the invention. Likewise, it is possible to feed the $C_5$ aldehyde mixture as formed in the hydroformylation into the aldol condensation, without the prior separation of individual isomers. In the aldol condensation, which can be performed by means of a basic catalyst, such as an aqueous solution of sodium or potassium hydroxide, for example by the processes described in EP-A 366089, U.S. Pat. No. 4,426,524 or U.S. Pat. No. 5,434,313, with the use of n-valeraldehyde 2-propylheptenal is formed as the only condensation product, whereas with use of a mixture of isomeric $C_5$ aldehydes an isomer mixture of the products of the homoaldol condensation of like aldehyde molecules and the crossed aldol condensation of different valeraldehyde isomers is formed. Of course, the aldol condensation can be controlled by the specific conversion of individual isomers such that a single aldol condensation isomer is predominantly or entirely formed. The aldol condensation products concerned can then be hydrogenated to the corresponding alcohols or alcohol mixtures with conventional hydrogenation catalysts, for example those mentioned above for the hydrogenation of aldehydes, usually after prior separation from the reaction mixture, preferably by distillation, and, if desired, purification by distillation.

As already mentioned, the compounds of the general formula (II) present in the plasticizer composition according to the invention can be esterified with pure 2-propylheptanol. In general, however, for the production of these esters, mixtures of the 2-propylheptanol with said propylheptanol isomers is used, in which the content of 2-propylheptanol is at least 50 wt. %, preferably 60 to 98 wt. % and particularly preferably 80 to 95 wt. %, in particular 85 to 95 wt. %.

Suitable mixtures of 2-propylheptanol with the propylheptanol isomers comprises for example those of 60 to 98 wt. % 2-propylheptanol, 1 to 15 wt. % 2-propyl-4-methylhexanol and 0.01 to 20 wt. % 2-propyl-5-methyl-hexanol and 0.01 to 24 wt. % 2-isopropylheptanol, wherein the sum of the contents of the individual components does not exceed 100 wt. %. Preferably, the contents of the individual components add up to 100 wt. %.

Further suitable mixtures of 2-propylheptanol with the propylheptanol isomers comprise for example those of 75 to 95 wt. % 2-propylheptanol, 2 to 15 wt. % 2-propyl-4-methyl-hexanol, 1 to 20 wt. % 2-propyl-5-methyl-hexanol, 0.1 to 4 wt. % 2-isopropylheptanol, 0.1 to 2 wt. % 2-isopropyl-4-methylhexanol and 0.1 to 2 wt. % 2-isopropyl-5-methyl-hexanol, wherein the sum of the contents of the individual components does not exceed 100 wt. %. Preferably, the contents of the individual components add up to 100 wt. %.

Preferred mixtures of 2-propylheptanol with the propylheptanol isomers comprise those with 85 to 95 wt. % 2-propylheptanol, 5 to 12 wt. % 2-propyl-4-methyl-hexanol and 0.1 to 2 wt. % 2-propyl-5-methylhexanol and 0.01 to 1 wt. % 2-isopropylheptanol, wherein the sum of the contents of the individual components does not exceed 100 wt. %. Preferably, the contents of the individual components add up to 100 wt. %.

With use of said 2-propylheptanol isomer mixtures instead of pure 2-propylheptanol for the production of the compounds of the general formula (II), the isomer composition of the alkyl ester groups or alkyl ether groups practically corresponds to the composition of the propylheptanol isomer mixtures used for the esterification.

Undecanol

The undecanols which are used for the production of the compounds of the general formula (II) present in the plasticizer composition according to the invention can be straight-chain or branched or be constituted of mixtures of straight-chain and branched undecanols. Preferably, mixtures of branched undecanols, also described as isoundecanol, are used as the alcohol component.

Essentially straight-chain undecanol can be obtained by rhodium- or preferably cobalt-catalyzed hydroformylation from 1-decene and subsequent hydrogenation of the n-undecanal thereby obtained. The starting olefin 1-decene is produced via the SHOP process previously mentioned in the of 1-octene.

For the production of branched isoundecanols, the 1-decene obtained in the SHOP process can be subjected to skeletal isomerization, e.g. by means of acidic zeolitic molecular sieve, as described in WO 9823566, whereby mixtures of isomeric decenes are formed, rhodium- or preferably cobalt-catalyzed hydroformylation whereof and subsequent hydrogenation of the isoundecanal mixtures leads to the isoundecanols used for the production of the compounds (II) used according to the invention. The hydroformylation of 1-decene or isodecene mixtures by rhodium- or cobalt catalysis can be effected as described above in connection with the synthesis of $C_7$ to $C_{10}$ alcohols. The same applies analogously for the hydrogenation of n-undecanal or isoundecanal mixtures to n-undecanol or isoundecanol respectively.

After purification of the output from the hydrogenation by distillation, the $C_7$ to $C_{11}$ alkyl alcohols or mixtures thereof thus obtained can be used as described above for the production of the diester compounds of the general formula (II) used according to the invention.

Dodecanol

Essentially straight-chain dodecanal can advantageously be obtained via the Alfol® or Epal® process. These processes comprise the oxidation and hydrolysis of straight-chain trialkylaluminum compounds, which are built up stepwise starting from triethylaluminum via several ethylation reactions using Ziegler-Natta catalyst. From the mixtures of largely straight-chain alkyl alcohols of different chain length resulting therefrom, the desired n-dodecanol can be obtained after extraction of the $C_{12}$ alkyl alcohol fraction by distillation.

Alternatively, n-dodecanol can also be produced by hydrogenation of natural fatty acid methyl esters, for example from coconut oil.

Branched isododecanol can be obtained analogously to the known processes for the codimerization and/or oligomerization of olefins, as for example described in WO 0063151, with subsequent hydroformylation and hydrogenation of the isoundecene mixtures, as for example described in DE-A 4339713. After purification of the output from the hydrogenation by distillation, the isododecanols or mixtures thereof thus obtained can be used, as previously described, for production of the diester compounds of the general formula (II) used according to the invention.

Plastisol Applications

As already stated, because of its good gelling properties the plasticizer composition according to the invention is particularly suitable for the production of plastisols.

A further subject of the invention therefore relates to the use of a plasticizer composition, as previously defined, as plasticizer in a plastisol.

Plastisols can be produced from various plastics. In a preferred embodiment, the plastisols according to the invention is a PVC plastisol.

The content of plasticizer composition according to the invention in the PVC plastisols is usually 5 to 300 phr, preferably 50 to 200 phr.

Plastisols are usually brought into finished product form at ambient temperatures by various processes such as coating processes, screen printing processes, molding processes, such as the slush molding or rotation molding process, dipping processes, spraying processes and the like. Next, the gelling is effected by heating, whereby a homogeneous, more or less flexible product is obtained after cooling.

PVC plastisols are suitable in particular for the production of PVC films, for the production of seamless hollow bodies and gloves, and for use in the textiles sector, such as for example for textile coatings.

The PVC plastisols based on the plasticizer composition according to the invention are especially suitable for the production of artificial leather, e.g. artificial leather for vehicle manufacture, underbody protection for vehicles, joint seals, carpet backing coatings, heavy duty coatings, conveyor belts, dip coatings and articles produced by dipping processes, toys such as dolls, balls or play animals, anatomical models for training, floor coverings, wall coverings, (coated) textiles such as latex clothing, protective clothing or rain clothing such as waterproof jackets, tarpaulins, tents, coil coatings, roofing felts, sealing compounds for closures, breathing masks and gloves.

Molding Compound Uses

The molding compound according to the invention is preferably used for the production of molded articles and films. These include in particular housings of electrical appliances, such as for example kitchen appliances and computer housings, tools, pipes, cables, hoses, such as for example plastic hoses, watering and irrigation hoses, industrial rubber hoses or chemical hoses, wire sheathings, window profiles, components for automobile construction, such as for example bodywork components, vibration dampers for engines, tires, furniture, such as for example chairs, tables or shelves, foam for pillow and mattresses, seals, composite films, such as films for composite safety glass, in particular for automobile windows and window panes, records, packaging containers, and adhesive tape films or coatings.

Apart from this, the molding compound according to the invention is also suitable for the production of molded articles and films which come directly into contact with people or foodstuffs. These are predominantly medicinal products, hygiene products, food packaging, products for interiors, toys and childcare articles, sport and leisure products, clothing or fibers for fabrics and the like.

The medicinal products which can be produced from the molding compound according to the invention are for example tubes for enteral nutrition and hemodialysis, ventilation tubes, infusion tubes, infusion pouches, blood pouches, catheters, tracheal tubes, disposable syringes, gloves or breathing masks.

The food packaging which can be produced from the molding compound according to the invention is for example cling film, food hoses, drinking water tubes, containers for storing or freezing foods, cover gaskets, closure caps, crown caps or artificial wine corks.

The products for the interior sector which can be produced from the molding compound according to the invention are for example ground coverings, which can be built up homogeneously or of several layers, consisting of at least one foamed layer, such as for example floor coverings, sports floors or luxury vinyl tiles (LVT), artificial leather, wall coverings or foamed or non-foamed wall coverings in buildings or facings or console coverings in vehicles.

The toys and childcare articles which can be produced from the molding compound according to the invention are for example dolls, inflatable toys such as balls, game pieces, modeling clay, swimming aids, toy car covering hoods, nappy changing pads, hot-water bottles, teething rings or bottles.

The sport and leisure products which can be produced from the molding compound according to the invention are for example gymnastics balls, practice mats, seat cushions, massage balls and rollers, shoes or shoe soles, balls, air mattresses or drinking bottles.

The clothing which can be produced from the molding compounds according to the invention are for example rubber boots.

Non-PVC Applications

In addition, the present invention comprises the use of the plasticizer composition according to the invention as an additive or/and in additives, selected from: calendering aids, rheological additives, surface-active compositions such as flow aids, film formation aids, defoamants, antifoam agents, wetting agents, coalescing agents and emulsifiers, lubricants such as lubricating oils, lubricating greases and lubricating pastes, quenchers for chemical reactions, phlegmatizing agents, pharmaceutical products, plasticizers in adhesives, impact modifiers and suspending agents.

The invention is explained in more detail on the basis of the figures described below and the examples. However the figures and examples should not be understood as limiting for the invention.

In the following examples and diagrams, the following abbreviations are used:

2,5-FDCS for 2,5-furandicarboxylic acid,
DINP for diisononyl phthalate,
DMAP for 4-dimethylaminopyridine,
THF for tetrahydrofuran, and
phr for parts by weight per 100 parts by weight polymer.
Description of Diagrams
FIG. 1:

FIG. 1 shows the gelling behavior of PVC plastisols each with a total content of plasticizer composition according to the invention of 60 phr. Here plasticizer compositions according to the invention which comprise the commercially available plasticizer Hexamoll® DINCH® and different quantities of the fast fuser 2,5-FDCS dibutyl ester were used. Additionally, the comparison is shown of the gelling behavior of PVC plastisols which comprise exclusively the commercially available plasticizers Hexamoll® DINCH® or Palatinol® N (DINP). The viscosity of the plastisols as a function of temperature is shown.

EXAMPLES

I) Production Examples of Compounds (I) Used According to the Invention

Example 1

Synthesis of di-(n-butyl) 2,5-furandicarboxylate by Direct Esterification 445 g (6.00 mol, 4.0 equivalents) n-butanol in 500 g toluene were placed in a 2 L round-necked flask equipped with a Dean-Stark water separator and a dropping funnel. The mixture was heated to reflux with stirring and 234 g (1.50 mol, 1.0 equivalents) of 2,5-furandicarboxylic acid were added, followed by 11.5 g (0.12 mol, 8 mol. %) of 99.9% sulfuric acid in 3 to 4 portions, whenever the reaction slowed. The course of the reaction was followed on the basis of the quantity of separated water in the Dean-Stark apparatus. After complete conversion, a sample was taken from the reaction mixture and analyzed by GC. The reaction mixture was cooled to room temperature, transferred into a separating funnel and washed twice with saturated $NaHCO_3$ solution. The organic phase was washed with saturated common salt solution, dried with anhydrous $Na_2SO_4$ and the solvent removed under reduced pressure. The crude product was purified by fractional distillation. The desired di-(n-butyl) 2,5-furandicarboxylate could thereby be obtained in a yield of 80% and a purity of 98.9%. The identity and purity of the final product was determined by NMR and GC-MS analysis (GC separating column: Agilent J&W DB-5, 30 m×0.32 mm×1.0 μm or Ohio Valley OV-1701 60 m×0.32 mm×0.25 μm).

II) Application Technology Tests

II.a) Determination of the Dissolution Temperature According to DIN 53408:

For the characterization of the gelling behavior of the compounds (I) used according to the invention in PVC, the dissolution temperature was determined according to DIN 53408. According to DIN 53408, one drop of a slurry of 1 g PVC in 19 g plasticizer is observed in transmitted light under a microscope equipped with a heatable microscope stage. During this, the temperature is increased linearly from 60° C. at 2° C. per minute. The temperature at which the PVC particles become invisible, i.e. their contours and contrasts can no longer be discerned, is regarded as the dissolution temperature. The lower the dissolution temperature, the better is the gelling behavior of the substance concerned for PVC.

In the following table, the dissolution temperatures of the plasticizer di(n-butyl) 2,5-furandicarboxylate and of Mesamoll® TP-LXS 5106 and of dibutyl phthalate as a comparison are shown.

| Ex. No. | Substance | Dissolution temperature according to DIN 53408 [° C.] |
|---|---|---|
| 1 | Di(n-butyl) 2,5-furandicarboxylate | 83 |
| V1 | Mesamoll ® TP-LXS 5106[1)] | 114 |
| V2 | Dibutyl phthalate[2)] | 100 |

[1)]Mixture of phenyl alkylsulfonate esters from Lanxess Deutschland GmbH (CAS No. 91082-17-6)
[2)]Di(n-butyl) benzene-1,2-dicarboxylate (CAS No. 84-74-2)

As is clear from the table, di(n-butyl) 2,5-furandicarboxylate shows the lowest dissolution temperature.

II.b) Determination of the Gelling Behavior of PVC Plastisols:

To investigate the gelling behavior of PVC plastisols based on the plasticizer compositions according to the invention, PVC plastisols which comprise the commercially available plasticizer Hexamoll® DINCH® and different quantities of the fast fuser 2,5-FDCS dibutyl ester (5 to 10 wt. %, based on the plasticizer composition used) were produced according to the following formula:

| Additive | phr |
|---|---|
| Solvin 372 NF[3)] | 100 |
| Plasticizer composition according to the invention | 60 |
| Reagent SLX 781[4)] | 2 |

[3)]commercially available PVC from Solvin GmbH & Co. KG, produced by suspension polymerization (K value as per ISO 1628-2: 73)
[4)]liquid Ba—Zn stabilizer from Reagens Deutschland GmbH Additionally, as a comparison, plastisols were produced which comprise exclusively the commercially available plasticizers Hexamoll® DINCH® or Palatinol® N (DINP).

The production of the plastisols was effected by adding the PVC to the weighed mixture of the plasticizer composition according to the invention and heat stabilizer with stirring by means of a dissolver at ca. 800 revolutions/minute. After completion of the PVC addition, the mixture was homogenized for 2.5 minutes at 2500 revolutions/minute and then deaerated under vacuum in a desiccator.

In order to gel a liquid PVC plastisol and to convert it from the state of PVC particles homogeneously dispersed in plasticizer into a homogeneous, solid soft PVC matrix, the energy necessary for this must be supplied in the form of heat. In one processing process, the parameters temperature and residence time are available for this. The faster the gelling proceeds (the index here is the dissolution temperature, i.e. the lower this is, the faster the material gels), the lower the temperature (at equal residence time) or the residence time (at equal temperature) that can be selected.

The investigation of the gelling behavior of a plastisol is carried out by an in-house method with an Anton Paar MCR101 rheometer. In this, the viscosity of the paste is measured with heating at constant shear (rotation). The measurement is made with a plate/plate system (PP50) starting at 30° C. at a shear rate of 10 1/s and a heating rate of 5° C./minute.

In general, the viscosity of a plastisol firstly decreases with increasing temperature and reaches a minimum. Next, the viscosity increases again. The temperature at the minimum of the curve and the steepness of the rise after minimum give indications as to the gelling behavior, i.e. the lower the temperature at the minimum and the steeper the subsequent rise, the better or faster the gelling takes place.

As can very clearly be discerned in FIG. 1, in comparison to the PVC plastisol which comprises exclusively the commercially available plasticizer Hexamoll® DINCH®, the PVC plastisol with the plasticizer composition according to the invention, gels markedly faster and at considerably lower temperatures. Furthermore, in the ungelled state, i.e. at temperatures below the gelling temperature, the PVC plastisols which comprise the plasticizer composition according to the invention have a markedly lower viscosity than a PVC plastisol which comprises exclusively the commercially available plasticizer Palatinol® N (DINP).

The invention claimed is:

1. A plasticizer composition comprising
a) at least one compound of the general formula (I),

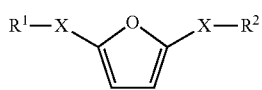

(I)

wherein
X is *—(C=O)—O—, *—(CH$_2$)$_n$—O— or *—(CH$_2$)$_n$—O—(C=O)—, wherein * represents the linkage point with the furan ring and n has the value 0, 1 or 2; and
R$^1$ and R$^2$ are mutually independently selected from C$_4$ alkyl and C$_5$-C$_6$ cycloalkyl, wherein the cycloalkyl residues are unsubstituted or can be substituted with at least one C$_1$-C$_{10}$ alkyl residue, b) at least one compound of the general formula (II),

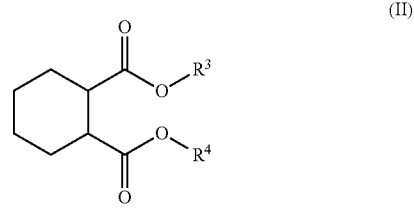

(II)

wherein
R$^3$ and R$^4$ are mutually independently selected from branched and unbranched C$_7$-C$_{12}$ alkyl residues and
wherein the content of the compounds of the general formula (I) in the plasticizer composition is 1 to 50 wt. % and
the content of the compounds of the general formula (II) in the plasticizer composition is 10 to 99 wt. %.

2. The plasticizer composition as claimed in claim 1, wherein R$^1$ and R$^2$ mutually independently are an unbranched or branched C$_4$ alkyl residue.

3. The plasticizer composition as claimed in claim 1, wherein R$^1$ and R$^2$ both are n-butyl or both are isobutyl.

4. The plasticizer composition as claimed in claim 1, wherein X is *—(C=O)—O—.

5. The plasticizer composition as claimed in claim 1, wherein R$^3$ and R$^4$ both are 2-ethylhexyl, both are isononyl or both are 2-propylheptyl.

6. The plasticizer composition as claimed in claim 1, wherein the plasticizer composition further comprises a plasticizer different from the compounds (I) and (II), which is selected from the group consisting of dialkyl phthalate esters, alkyl aralkyl phthalate esters, 1,2-cyclohexanedicarboxylate esters different from compounds (II), dialkyl terephthalate esters, trialkyl trimellitate esters, alkyl benzoate esters, dibenzoate esters of glycols, hydroxybenzoate esters, esters of saturated mono- and dicarboxylic acids, esters of unsaturated dicarboxylic acids, amides and esters of aromatic sulfonic acids, alkylsulfonate esters, glycerin esters, isosorbide esters, phosphate esters, citric acid triesters, alkylpyrrolidone derivatives, 2,5-furandicarboxylate esters different from compounds (I), 2,5-tetrahydrofurandicarboxylate esters, epoxidized plant oils and epoxidized fatty acid monoalkyl esters, and polyesters of aliphatic and/or aromatic polycarboxylic acids with at least dihydric alcohols.

7. The plasticizer composition as claimed in claim 1, wherein the weight ratio between compounds of the general formula (I) and compounds of the general formula (II) is in the range from 1:100 to 1:1.

8. A molding compound comprising at least one polymer and one plasticizer composition as defined in claim 1.

9. The molding compound as claimed in claim 8, wherein the polymer is a thermoplastic polymer which is selected from
homo- or copolymers which comprise at least monomer incorporated by polymerization, which is selected from C$_2$-C$_{10}$ monoolefins, 1,3-butadiene, 2-chloro-1,3-butadiene, vinyl alcohol and C$_2$-C$_{10}$ alkyl esters thereof, vinyl chloride, vinylidene chloride, vinylidene fluoride, tetrafluoroethylene, glycidyl acrylate, glycidyl methacrylate, acrylates and methacrylates of C$_1$-C$_{10}$ alcohols, vinylaromatics (meth)acrylonitrile, maleic anhydride and α,β-ethylenically unsaturated mono- and dicarboxylic acids,
homo- and copolymers of vinyl acetals,
polyvinyl esters,
polycarbonates,
polyesters,
polyethers,
polyether ketones,
thermoplastic polyurethanes,
polysulfides,
polysulfones,
polyether sulfones,
cellulose alkyl esters,
and mixtures thereof.

10. The molding compound as claimed in claim 9, wherein the thermoplastic polymer is selected from polyvinyl chloride (PVC), polyvinyl butyral (PVB), homo- and copolymers of vinyl acetate, homo- and copolymers of styrene, polyacrylates, thermoplastic polyurethanes (TPU) or polysulfides.

11. The molding compound as claimed in claim 9, where the thermoplastic polymer is polyvinyl chloride (PVC).

12. The molding compound as claimed in claim 11, where the content of the plasticizer composition in the molding compound is 1.0 to 300 phr.

13. The molding compound as claimed in claim 9, comprising at least one thermoplastic polymer different from polyvinyl chloride, where the content of the plasticizer composition in the molding compound is 0.5 to 300 phr.

14. The molding compound as claimed in claim 8, where the polymer is an elastomer.

15. The molding compound as claimed in claim 8, where the polymer is natural rubber, synthetic rubber or a mixture thereof.

16. The molding compound as claimed in claim 14, wherein the content of the plasticizer composition in the molding compound is 1.0 to 60 phr.

17. A process for the production of molded articles and films which comprises utilizing the plasticizer composition as claimed in claim 1.

18. The molded articles or film produced by the process of claim 17, which come directly into contact with people or foods are medicinal products, hygiene products, food packaging, products for interiors, toys and childcare articles, sport and leisure products, clothing or fibers for fabrics.

* * * * *